United States Patent
Mahdy et al.

(10) Patent No.: US 11,782,941 B2
(45) Date of Patent: *Oct. 10, 2023

(54) VISUAL ANALYSIS OF DATA USING SEQUENCED DATASET REDUCTION

(71) Applicant: Palantir Technologies Inc., Palo Alto, CA (US)

(72) Inventors: Mohammady Mahdy, Abu Dhabi (AE); Joseph Carter, Arlington, VA (US)

(73) Assignee: Palantir Technologies Inc., Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/648,890

(22) Filed: Jan. 25, 2022

(65) Prior Publication Data

US 2022/0147521 A1 May 12, 2022

Related U.S. Application Data

(63) Continuation of application No. 16/710,776, filed on Dec. 11, 2019, now Pat. No. 11,269,906, which is a continuation of application No. 15/375,894, filed on Dec. 12, 2016, now Pat. No. 10,545,975.

(60) Provisional application No. 62/353,233, filed on Jun. 22, 2016.

(51) Int. Cl.
| | |
|---|---|
| *G06F 16/248* | (2019.01) |
| *G06F 16/25* | (2019.01) |
| *G06F 16/9535* | (2019.01) |
| *G06F 16/26* | (2019.01) |
| *G06F 16/242* | (2019.01) |
| *G06F 16/28* | (2019.01) |
| *G06F 3/04847* | (2022.01) |
| *G06F 40/221* | (2020.01) |

(52) U.S. Cl.
CPC ........ *G06F 16/248* (2019.01); *G06F 16/2425* (2019.01); *G06F 16/252* (2019.01); *G06F 16/26* (2019.01); *G06F 16/9535* (2019.01); *G06F 3/04847* (2013.01); *G06F 16/2423* (2019.01); *G06F 16/283* (2019.01); *G06F 40/221* (2020.01)

(58) Field of Classification Search
CPC .. G06F 16/248; G06F 16/2425; G06F 16/252; G06F 16/26; G06F 16/9535; G06F 16/2423; G06F 3/04847
See application file for complete search history.

(56) References Cited

U.S. PATENT DOCUMENTS

| | | | | |
|---|---|---|---|---|
| 9,201,924 | B1 * | 12/2015 | Fuller | G06F 16/24542 |
| 9,471,657 | B1 * | 10/2016 | Xiao | G06F 16/27 |
| 2013/0070753 | A1 * | 3/2013 | Sahni | H04L 45/021 370/351 |
| 2015/0356186 | A1 * | 12/2015 | Konik | G06F 16/9038 707/706 |

(Continued)

*Primary Examiner* — Dangelino N Gortayo
(74) *Attorney, Agent, or Firm* — Faegre Drinker Biddle & Reath LLP

(57) ABSTRACT

Systems and methods for implementing sequenced filter templates to intelligently reduce a dataset to find useful patterns and source data are disclosed. An expert investigative user may configure a filter template comprising a series of filters organized in a sequence desired by the expert user. The filter template can be customized by an end user to reduce a dataset and perform guide investigation of the reduced dataset.

20 Claims, 20 Drawing Sheets

(56) References Cited

U.S. PATENT DOCUMENTS

2016/0098493 A1\* 4/2016 Primke ................ G06F 16/245
707/754

\* cited by examiner

VISUAL ANALYSIS OF DATA USING SEQUENCED DATASET REDUCTION

RELATED MATTERS

The present application is a continuation of U.S. patent application Ser. No. 16/710,776 filed Dec. 11, 2019, which application is a continuation of U.S. patent application Ser. No. 15/375,894 filed Dec. 12, 2016, which claims priority to and incorporates by reference U.S. Provisional Application No. 62/353,233 filed Jun. 22, 2016, entitled "Visual Analysis of Data using Sequenced Dataset Reduction." The entire contents of which are incorporated herein by reference.

TECHNICAL FIELD

Embodiments of the present disclosure relate generally to database queries and, more particularly, but not by way of limitation, to enhanced visual analysis of data using sequenced dataset reduction.

BACKGROUND

Users can query databases to perform investigations and find target data, e.g., the source of a food poisoning outbreak. However, due to the stratospheric rise in data collection, the amount of data to be analyzed using queries makes investigations impractical, and target data may never be found. Inexperienced data investigators often analyze a dataset down the wrong path, reducing the dataset to yield a useless result. As is evident, there is a demand for improved data investigation tools.

BRIEF DESCRIPTION OF THE DRAWINGS

Various ones of the appended drawings merely illustrate example embodiments of the present disclosure and should not be considered as limiting its scope.

DETAILED DESCRIPTION

Figure 1:
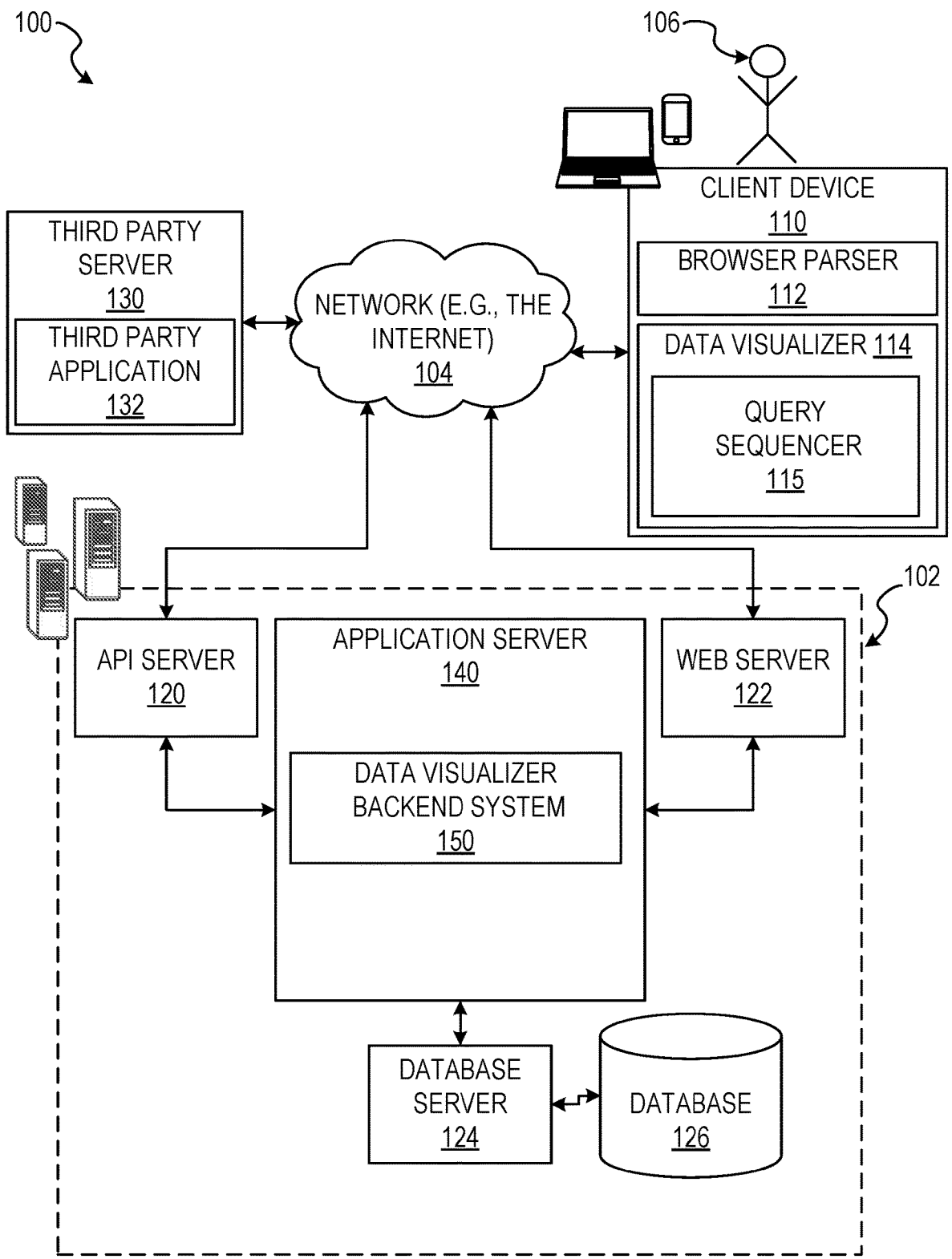
FIG. 1 is a block diagram illustrating various functional components of a query sequencer network architecture, according to some example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

In various example embodiments, investigation of datasets can be enhanced through sequenced dataset reduction using sequenced filter templates. Reducing datasets using filters can result in widely varying results, many of which may not be useful for the type of analysis being conducted. For example, a user investigating a dataset trying to find the source of a food poisoning outbreak may implement different filters (e.g., filtering by distance, years, past outbreak data) to reduce the dataset to find the source of the outbreak. However, which filters are applied and in what order can drastically change the resulting dataset. For instance, an inexperienced user may apply a distance filter early in the analysis and inadvertently filter out the source of the outbreak.

These issues can be addressed using a sequenced filter template that reduces a dataset in a specific way—applying particular filters in a specified order—to yield a resultant dataset that more readily highlights the desired target to be identified (e.g., a source of a food poisoning outbreak). A sequenced filter template comprises a set of filters to be applied to a dataset in a specified sequence. The ordering of the sequence may, for example, be configured by an expert investigator that understands how to properly reduce a dataset to yield useful results. The expert investigator may, for example, be an individual that is familiar with past investigations and understands how to properly drill-down a set of data with multiple filters to yield a reduced dataset that readily identifies target sources.

To create datasets for analysis, in some embodiments, a browser may be configured to detect whether a webpage is parsable, and generate a parse interface to assist parsing useful datasets from the webpage. In some embodiments, the browser parse functionality is implemented using a browser plugin. The plugin detects the website of a webpage displayed within the browser and determines whether the website is parsable. If the website is parsable, the browser plugin parses the webpage and displays a parse user interface, which displays input fields auto-populated with parsed data from the webpage. The user may modify, remove, or add additional data to the input fields and submit directly to the backend system, which may in turn receive the data and store it as part of the dataset for analysis.

FIG. 1 is a block diagram illustrating various functional components of a query sequencer network architecture, according to some example embodiments. A networked system 102 provides server-side functionality via a network 104 (e.g., the Internet or wide area network (WAN)) to one or more client devices 110. In some implementations, a user (e.g., user 106) interacts with the networked system 102 using the client device 110. FIG. 1 illustrates, for example, a browser parser 112 (e.g., a browser), and a data visualizer 114 executing on the client device 110. The client device 110 includes the browser parser 112, and the data visualizer 114, alone, together, or in any suitable combination. Although FIG. 1 shows one client device 110, in other implementations, the network architecture 100 comprises multiple client devices.

In various implementations, the client device 110 comprises a computing device that includes at least a display and communication capabilities that provide access to the networked system 102 via the network 104. The client device 110 comprises, but is not limited to, a remote device, work station, computer, Internet appliance, hand-held device, wireless device, portable device, wearable computer, cellular or mobile phone, Personal Digital Assistant (PDA), smart phone, tablet, ultrabook, netbook, laptop, desktop, multi-processor system, microprocessor-based or programmable consumer electronic, game consoles, set-top box, network Personal Computer (PC), mini-computer, and so forth. In an example embodiment, the client device 110 comprises one or more of a touch screen, accelerometer, gyroscope, biometric sensor, camera, microphone, Global Positioning System (GPS) device, and the like.

The client device 110 communicates with the network 104 via a wired or wireless connection. For example, one or more portions of the network 104 comprises an ad hoc network, an intranet, an extranet, a Virtual Private Network (VPN), a Local Area Network (LAN), a wireless LAN (WLAN), a Wide Area Network (WAN), a wireless WAN (WWAN), a Metropolitan Area Network (MAN), a portion of the Internet, a portion of the Public Switched Telephone Network (PSTN), a cellular telephone network, a wireless network, a Wireless Fidelity (WI-FI®) network, a Worldwide Interoperability for Microwave Access (WiMax) network, another type of network, or any suitable combination thereof.

In some example embodiments, the client device 110 includes one or more of the applications (also referred to as "apps"). In some example embodiments, the browser parser 112 and data visualizer 114 access the various systems of the networked system 102 via a web interface supported by a web server 122. In some example embodiments, the browser parser 112 and data visualizer 114 access the various services and functions provided by the networked system 102 via a programmatic interface provided by an Application Program Interface (API) server 120. The data visualizer 114 is a dataset visualization tool that is configured to manipulate datasets and display visualizations that allow a human user to detect patterns, trends, or signals that would not previously have been detectable (e.g., signals that would otherwise be lost in noise). The data visualizer 114 is configured to work with a data visualizer backend system 150, which performs backend operations for the client side data visualizer 114. In some example embodiments, the data visualizer 114 is run from a browser as a web service and the data visualizer backend system 150 serves as the web service for the front end, e.g., the data visualizer 114.

The query sequencer 115 manages the sequenced filter template functionality for the data visualizer 114. In some embodiments, the query sequencer 115 is configured as a plugin that plugs into the data visualizer 114 to enhance the filtering capabilities of the data visualizer 114. As discussed in further detail below, in some embodiments, the modules and functionalities of the query sequencer 115 may be directly integrated into the data visualizer 114. The browser parser 112 is an Internet browser that is configured to parse webpages, and submit information obtained from parsing to a backend system for storage in the dataset. In some embodiments, the browser parser 112 is an Internet browser with a plugin that is configured to perform the parse operations.

Users (e.g., the user 106) comprise a person, a machine, or other means of interacting with the client device 110. In some example embodiments, the user 106 is not part of the network architecture 100, but interacts with the network architecture 100 via the client device 110 or another means. For instance, the user 106 provides input (e.g., touch screen input or alphanumeric input) to the client device 110 and the input is communicated to the networked system 102 via the network 104. In this instance, the networked system 102, in response to receiving the input from the user 106, communicates information to the client device 110 via the network 104 to be presented to the user 106. In this way, the user 106 can interact with the networked system 102 using the client device 110.

The API server 120 and the web server 122 are coupled to, and provide programmatic and web interfaces respectively to, one or more application server 140. The application server 140 can host a data visualizer backend system 150 configured to support the data visualizer 114, each of which comprises one or more modules or applications and each of which can be embodied as hardware, software, firmware, or any combination thereof. The application server 140 are, in turn, shown to be coupled to one or more database server 124 that facilitate access to one or more information storage repositories or database 126. In an example embodiment, the database 126 are storage devices that store database objects parsed from browser parser 112, as well as store datasets to be analyzed by the data visualizer 114.

Additionally, a third party application 132, executing on third party server 130, is shown as having programmatic access to the networked system 102 via the programmatic interface provided by the API server 120. For example, the third party application 132, utilizing information retrieved from the networked system 102, supports one or more features or functions on a website hosted by the third party. The third party website, for example, provides webpages which can be parsed using the browser parser 112.

Further, while the client-server-based network architecture 100 shown in FIG. 1 employs a client-server architecture, the present inventive subject matter is, of course, not limited to such an architecture, and can equally well find application in a distributed, or peer-to-peer, architecture system, for example. The various systems of the application server 140 (e.g., the data visualizer backend system 150) can also be implemented as standalone software programs, which do not necessarily have networking capabilities.

Figure 2:
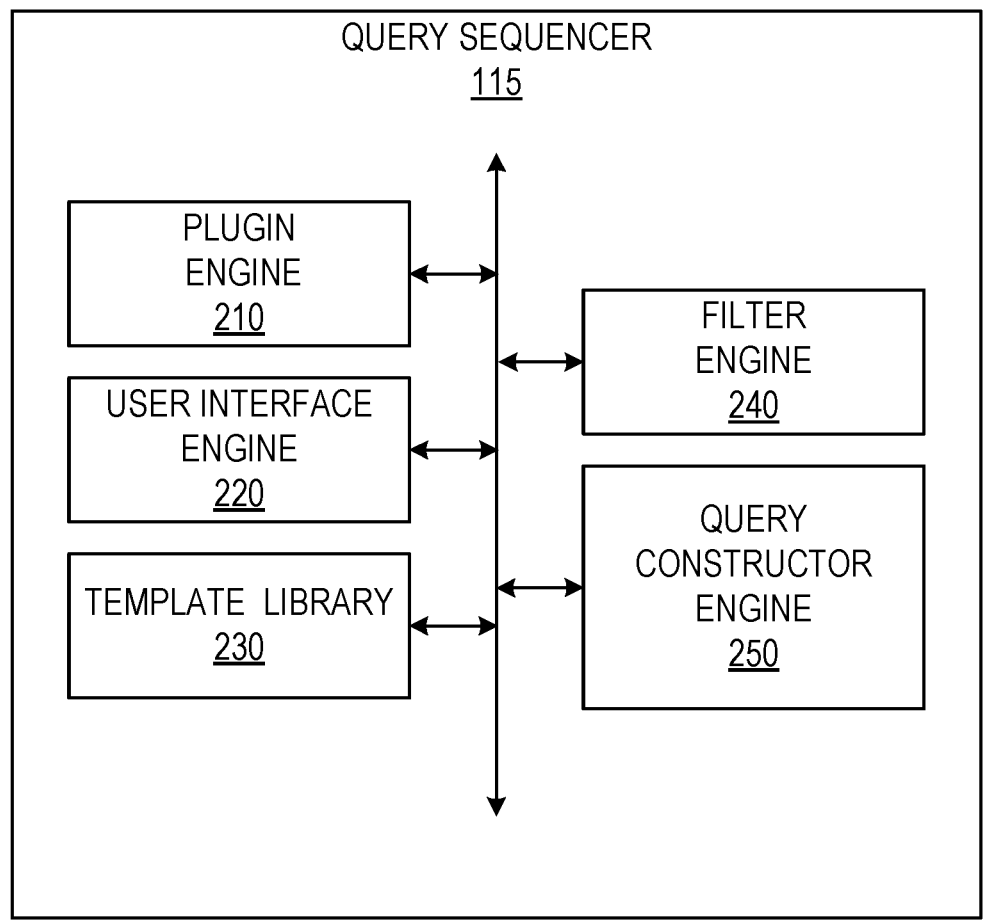
FIG. 2 is a block diagram illustrating various functional modules that form a query sequencer, according to some example embodiments.

FIG. 2 is a block diagram illustrating various functional modules that form a query sequencer 115, according to some example embodiments. In various example embodiments, the query sequencer 115 comprises a plugin engine 210, a user interface engine 220, a template library, 230, a filter engine 240, and a query constructor engine 250. The plugin engine 210 is a communication interface that integrates the query sequencer 115 into the data visualizer 114 though a plugin specification of the data visualizer 114.

The user interface engine 220 is configured to generate and display user interfaces for implementing the sequenced and display filter templates. The template library 230 is a library of available sequenced filter templates for selection by a user. Each of the templates may be configured by an expert user to drill down and solve different types of investigative problems. For example, one template in the template library 230 can drill-down into a set of restaurant distribution and logistics data to detect the source of a food poisoning outbreak. In some example embodiments, each of the sequenced filter templates specifies a sequence in which to apply filters to a dataset in order to produce a reduced dataset useful for analysis.

Though an investigative scenario involving food poisoning is discussed here for illustrative purposes, it is appreciated that each sequence filter template can be configured for widely varying investigative purposes, e.g., detecting bank fraud, analyzing shipping/logistics problems, tracking humanitarian aid, detecting cyber threats, and other analysis problems.

The filter engine 240 manages the filters applied by templates of the template library 230. Each of the filters may have custom configured functionality that may be further refined by customization parameters by the non-expert user at runtime of a selected filter. For example, a years filter may be preconfigured by the expert to return datasets matching a year range 1990-1999 (10 years), while a customization parameter may change the span of years, e.g., 1995-1999 (5 years), shift the year range 2000-2009 (10 years, shifted), or other changes.

The query constructor engine 250 receives or retrieves the sequenced filter template from the template library 230, receives filter data including filter logic and customizable parameter data as available, and constructs sequenced query code for submission to the data visualizer 114 or submission to the data visualizer backend system 150. The sequenced query code can be structured query language, or other types of programmatic language to query a database.

One technical advantage of query sequencer 115 implementing sequenced filter templates is that non-expert users (e.g., users applying a configured sequenced filter template) can generate a reduced dataset that is similar to or the same as a reduced dataset generated by an expert investigative user. An additional technical advantage stems from the usability. Non-expert users may be of at least two types: a user that does not know the correct ordering of filters to apply, or a user that does not know how to produce the query code. In some cases, a non-expert user may not know the correct ordering of filters and may not know how to produce the query code for a sequenced filter. The query sequencer 115 handles both of these shortcomings by using expert-created filter templates to handle order sequencing, and user interfaces and the query constructor engine 250 to allow a non-expert user to product query code for a sequenced template filter without having to write query code.

Figure 3:
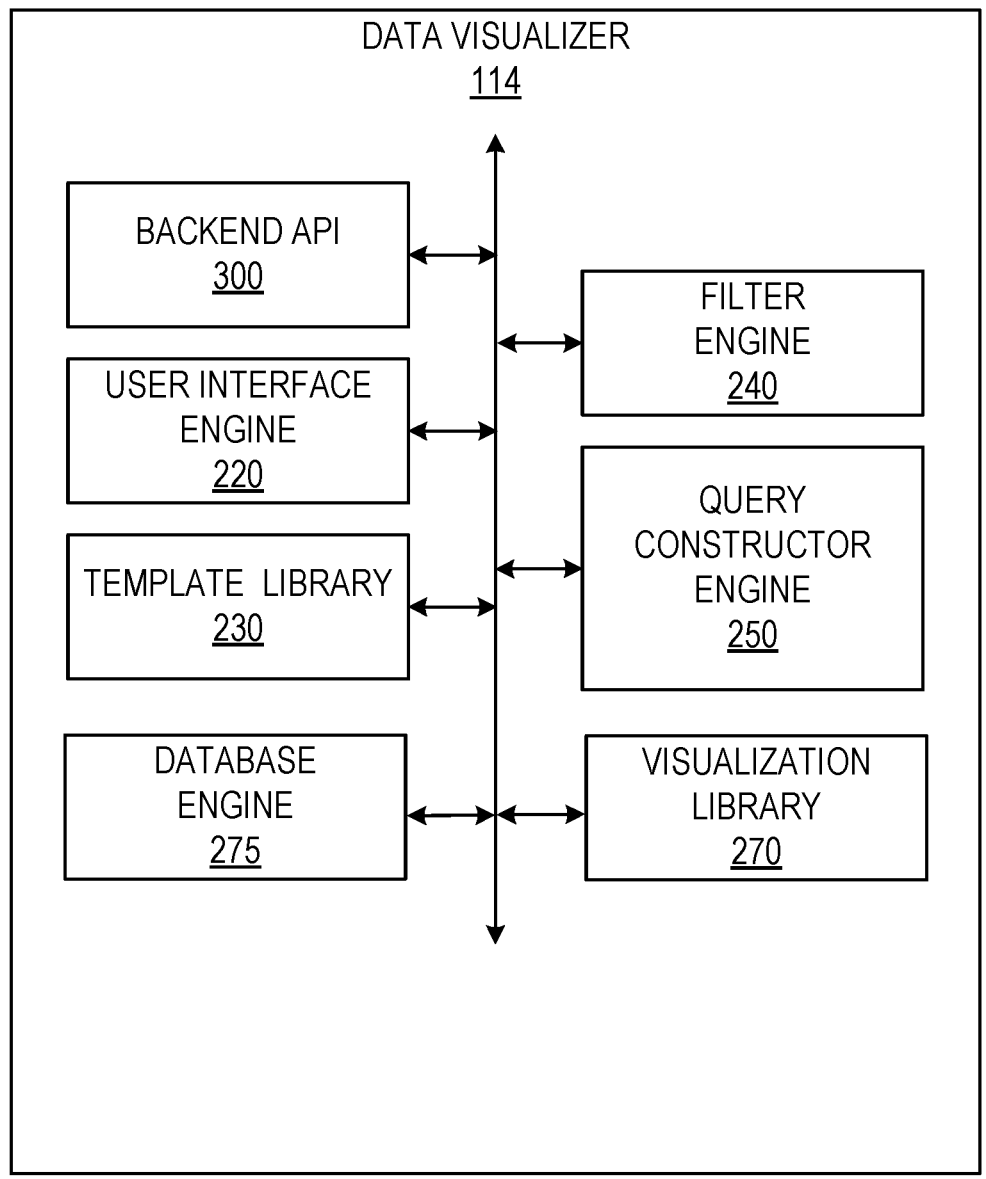
FIG. 3 is a block diagram illustrating various functional modules that form a data visualizer, according to some example embodiments.

FIG. 3 is a block diagram illustrating various functional modules that form a data visualizer 114, according to some example embodiments. As discussed, the data visualizer 114 may have the plugin functionality of the query sequencer 115 built into the application framework of the data visualizer 114. Thus, in these embodiments, the data visualizer 114 may comprise some or all of the components of the query sequencer 115, including the user interface engine 220, the template library 230, the filter engine 240, and the query constructor engine 250.

The data visualizer 114 may further include additional components used to communicate with other network components, manipulate data, and generate visualizations of data for analysis. As illustrated in the example embodiment of FIG. 3, the data visualizer 114 comprises a backend API 300, a visualization library 270, and database engine 275. The backend API 300 is configured to connect to the data visualizer backend system 150 to submit sequenced queries and receive results. The visualization library 270 includes a plurality of visualizations that may be applied to datasets and displayed on a display device (e.g., of client device 110) to allow an investigative user to investigate data and detect patterns and sources previously undetectable. The database engine 275 is a database service that can receive queries and retrieve corresponding data from a database. In some embodiments, the database engine 275 is implemented in the client device 110, where the client device 110 stores datasets locally, while in some example embodiments, where the dataset to be reduced is not local to the client device 110, the database engine 275 may be integrated in the data visualizer backend system 150 or database server 124.

Figure 4:
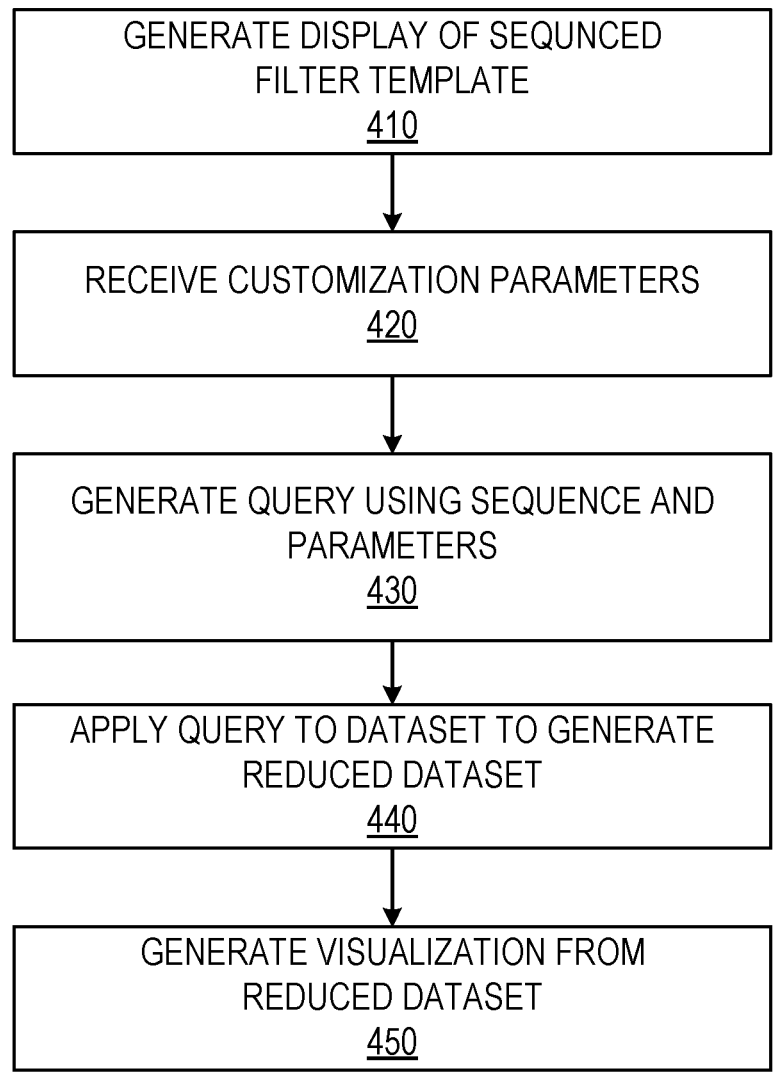
FIG. 4 is a flow diagram illustrating a method for generating a reduced dataset using a sequenced filter template, according to some example embodiments.

FIG. 4 is a flow diagram illustrating a method for generating a reduced dataset using a sequenced filter template, according to some example embodiments.

The method 400 may be embodied in machine-readable instructions for execution by a hardware component (e.g., a processor) such that the operations of the method 400 may be performed by the data visualizer 114; accordingly, the method 400 is described below, by way of example with reference thereto. However, it shall be appreciated that the method 400 may be deployed on various other hardware configurations and is not intended to be limited to the data visualizer 114. At operation 410, the user interface engine 220 generates a display of a selected sequenced filter template on a display screen of client device 110. The selected sequence template may be selected from the template library 230. The display of the selected sequenced filter template comprises fields for customization parameters to modify the functionality of the filters, as described above.

At operation 420, the plugin engine 210 receives customization parameters (e.g., entered by the user 106 using a user interface presented on the client device 110). In some example embodiments, customization parameters modify the scope or effect of a filter. For example, a filter may be a year range filter that filters out data not in a given range. A customization parameter can change the range in duration (e.g., last five years, last 24 hours), modify the starting and ending points of the filter, or other modifications. Further details of customization parameters are discussed below with reference to FIGS. 6, 7, and 8A-8D.

At operation 430, the query constructor engine 250 generates query code using the selected filter template. The query constructor engine 250 generates each filter, modifies each filter according to received customization parameters, and arranges the filters into a sequence in the query.

At operation 440, the query comprising the plurality of filters modified by customization parameters is applied to a dataset to filter data per each filter to result in a reduced dataset. In some example embodiments, the reduced dataset is a dataset honed by a user to more readily display patterns and find target sources. At operation 450, the visualization library 270 displays the reduced dataset using one or more visualizations. For example, the visualization library 270 may display the reduced dataset as graph data having nodes connected by edges. FIGS. 8E-H illustrate example visualizations that may be used to display the reduced dataset, according to some example embodiments.

The flow diagram in FIG. 4 shows a method 400 where the client device 110 is capable of applying the constructed query to the dataset to generate the reduced dataset. In some embodiments, the client device 110 is not configured to apply the query to the dataset. For example, the data visualizer 114 may be implemented as a cloud service on a browser running from the client device 110. In those example embodiments, the data visualizer 114 may transmit the constructed query to the application server 140 for further processing.

Figure 5:
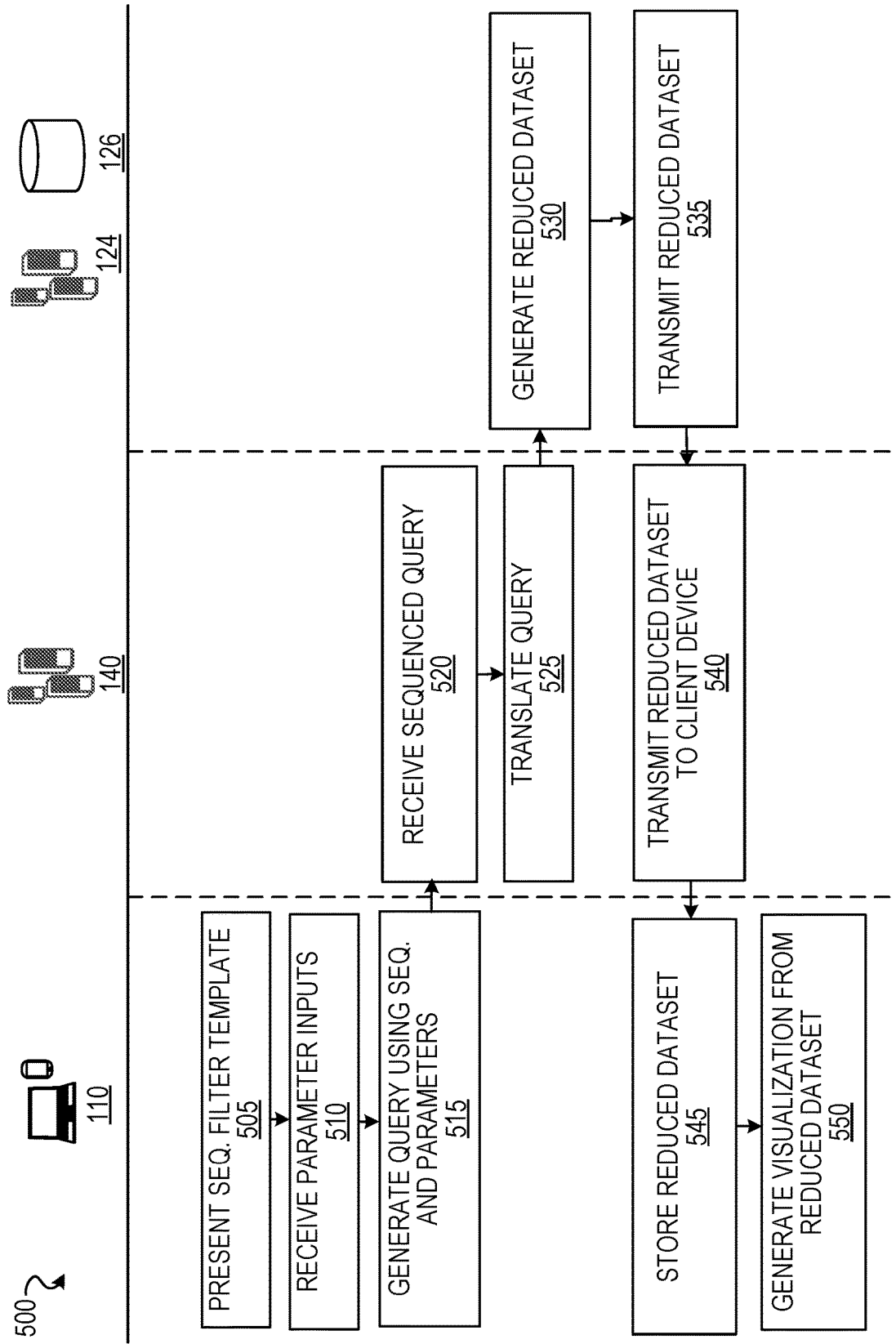
FIG. 5 is a flow diagram illustrating a method for generating a reduced dataset using a sequenced filter template across a network, according to some example embodiments.

FIG. 5 is a flow diagram illustrating a method 500 for generating a reduced dataset using a sequenced filter template across a network, according to some example embodiments. The client device 110 contacts the application server 140 through the network 104 and the application server 140 and the database server 124 are executed from separate physical machines. In some embodiments, the application server 140 is a server specially configured to receive requests from the data visualizer 114 and function as a backend web service provider. In some embodiments, the database server 124 is a commercially available database server (e.g., Oracle database server) that is configured to receive queries in a specified SQL type. In those example embodiments, the data visualizer backend system 150 are configured to receive queries from the data visualizer 114 and translate them to the SQL type of the database server 124. In some embodiments, the application server 140 or data visualizer backend system 150 has the database functionality of database server 124 integrated into the application server 140 or data visualizer backend system 150. Thus, it is appreciated that the columns divisions of the method 500 are illustrated strictly as an example, and other configurations are possible per implementation.

At operation 505, the user interface engine 220 generates a display of a selected sequenced filter template on a display screen of client device 110. The selected sequence template may be selected from the template library 230. The display of the selected sequenced filter template comprises fields for customization parameters to modify the functionality of the filters.

At operation 510, the plugin engine 210 receives customization parameters from the user 106. At operation 515, the query constructor engine 250 generates query code using the selected filter template. The query constructor engine 250 generates code for each filter, modifies each filter according to received customization parameters, and arranges the filters into a sequence in the query. The query may then be passed through the backend API 300, over network 104, to the application server 140. At operation 520, the data visualizer backend system 150 receives the sequenced query. At operation 525, the data visualizer backend system 150 translates the query to a code format for the database server 124 if necessary. For example, the query received at operation 520 may be in a proprietary query language and database server 124 may be an off-the-shelf commercially available platform (e.g., an Oracle Database system) that uses structured query language incompatible with the proprietary query language. In such an example embodiment, at operation 525 the query is translated from the proprietary query language format to the query language of database server 124 (e.g., Oracle SQL), such that the ordering of the filter sequence and parameters of the original query generated at operation 515 are retained. The backend API 300 transmits the query (e.g., translated query) to the database server 124. At operation 530, the database server 124 apply the query to a dataset in database 126 to generate the reduced dataset. At operation 535, the database server 124 transmits the reduced dataset to the application server 140. At operation 540, the data visualizer backend system 150 transmits the reduced dataset to the backend API 300 of the data visualizer 114 on client device 110.

At operation 545, the backend API 300 stores the reduce dataset on memory local to the client device 110, according to some example embodiments. At operation 550, the visualization library 270 uses the stored reduced dataset to generate a visualization and display the visualized reduced dataset on the display screen of client device 110. The user 106 may then view and manipulate the reduced dataset to identify target data (e.g., food poisoning source).

Figure 6:
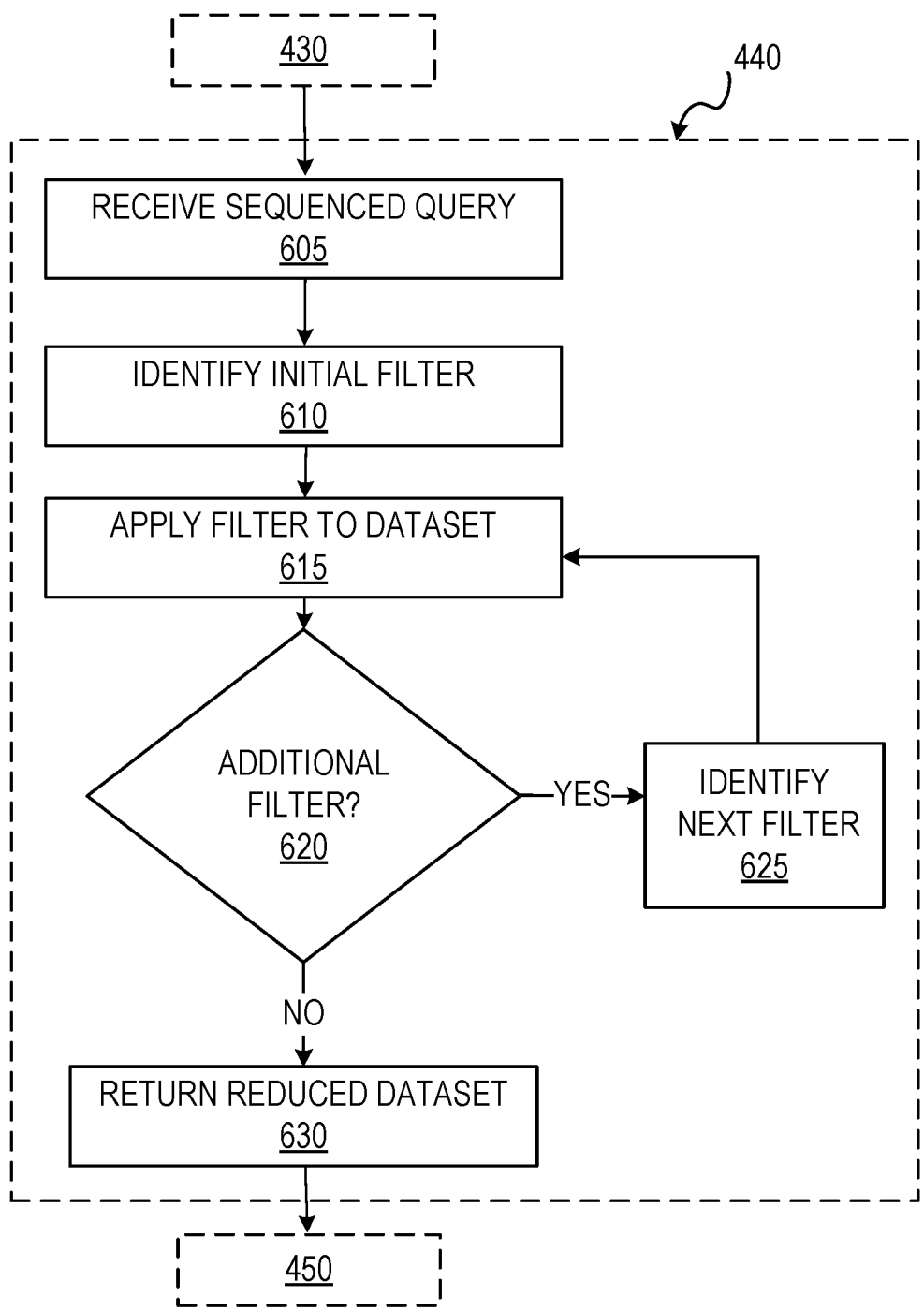
FIG. 6 is a flow diagram illustrating a method for applying filters of a sequenced filter template, according to some example embodiments.

FIG. 6 is a flow diagram illustrating a method for applying filters of a sequenced filter template, according to some example embodiments. As illustrated, in some example embodiments, the flow diagram depicted in FIG. 6 can be implemented as a subroutine for operation 440 of method 400, which is an operation where the database engine 275 applies the sequenced filter template to the dataset to generate the reduced dataset. The flow diagram depicted in FIG. 6 shows a method of filtering using multiple loops or iterations. It is appreciated that in some example embodiments, the constructed query is configured to apply all filters in the sequence in one operation.

At operation 605, the database engine 275 receives the constructed sequenced query. At operation 610, the database engine 275 identifies the first filter in the sequence of the sequenced filter template. At operation 615, the database engine 275 applies the filter to the dataset to generate a first reduced dataset. At operation 620, the database engine 275 determines whether there are additional filters in the sequenced query. If there are additional filters in the sequence, then at operation 625, the next filter in the sequence is identified and the process goes to operation 615, where the next filter is applied. When there are no more filters in the sequenced, the operation continues to operation 630 where the dataset reduced by one or more filters is returned or output as the reduced dataset.

Figure 7:
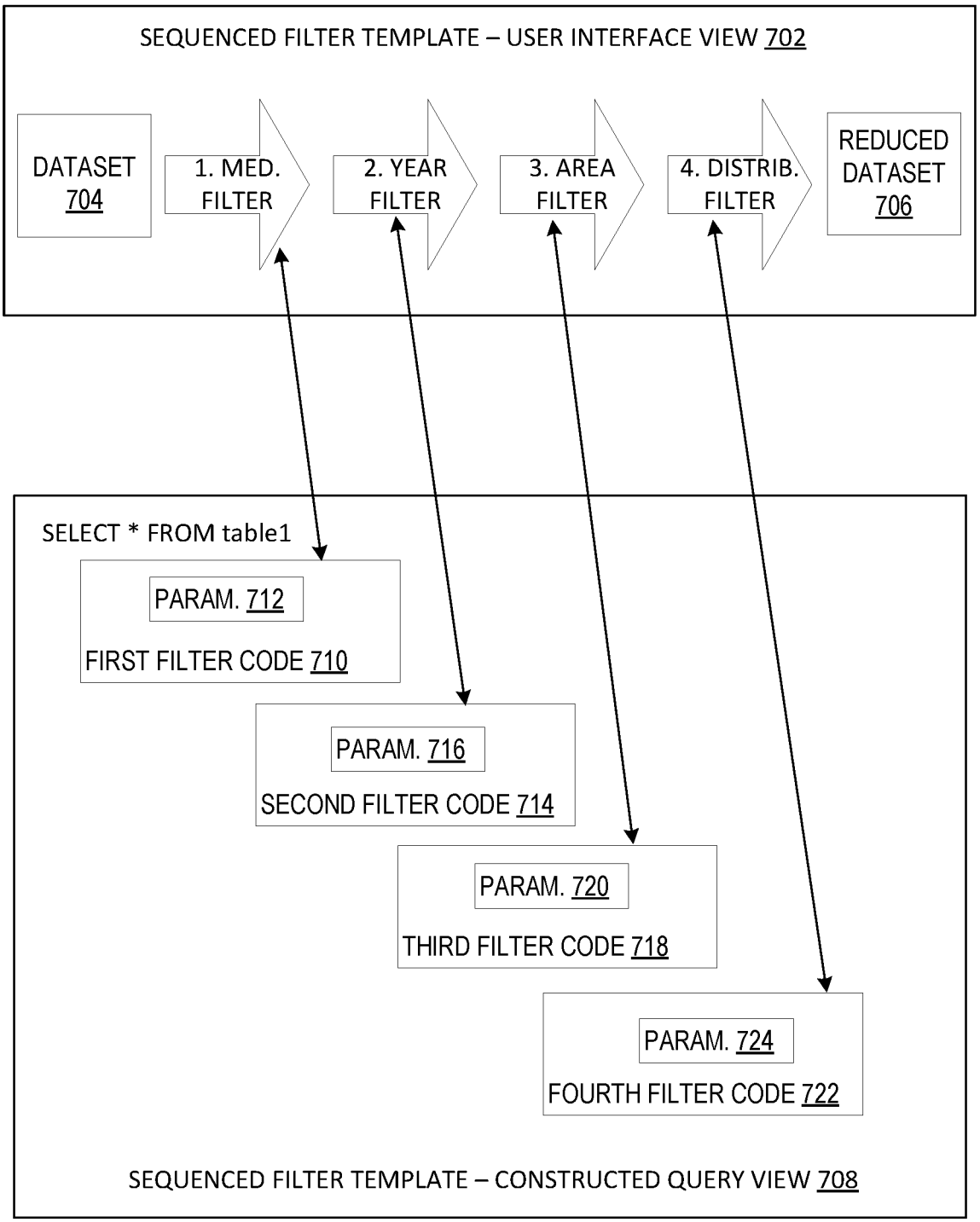
FIG. 7 is a diagram illustrating a user interface view and a constructed query view of a sequenced filter template, according to some embodiments.

FIG. 7 is a diagram illustrating a user interface view 702 and a constructed query view 708 of a sequenced filter template, according to some embodiments. The user interface view 702 may be displayed to the user 106 on the display screen of the client device 110 to allow the user 106 to view the sequence and understand the flow of the sequenced filter. As illustrated in the user interface view 702, the dataset 704 the initial unfiltered dataset. A series of four right-pointing arrows show example filters and the order of the sequence, from left to right. The filters are applied according to the sequence and specified parameters to generate reduced dataset 706. The functionality of each filter is discussed in further detail below, with reference to FIG. 7, according to some example embodiments.

The constructed query view 708 is a logical view of the query code constructed by the query constructor engine 250, according to some example embodiments. As illustrated, the query may be implemented using structured query language (SQL) designed to access the database 126, though it is appreciated that the filtering code implemented can be other programming languages, according to some embodiments. The expert investigative user may be a programmer or code developer that is fluent or experienced in writing the query or filter code. Once the query code is written and stored to the query sequencer as a sequence filter template, the non-expert user can use the query code through user interface objects (e.g., checkboxes, drag and drop elements) as shown in further detail below.

The example query code beings with "SELECT * FROM table1", where "SELECT" and "FROM" are statements of the query and "table1" is an example dataset to be reduced. Each of the four filters represented by arrows corresponds to filter code, as indicated by the double-sided arrows. In particular, the left-most arrow, a "medium" filter, corresponds to first filter code 710, which comprises additional query code (e.g., WHERE, AND, OR, etc.), as specified by the expert user. As illustrated, the first filter code 710 comprises parameter data 712 that includes one or more customization parameters that can be customized by the non-expert user when implementing the sequenced filter template. Similarly, the second filter (a "year" filter) corresponds to second filter code 714 with one or more parameter data 716, the third filter (an "area" filter) corresponds to the third filter code 718 with parameter data 720, and the fourth filter (a "distributor" filter) corresponds to the fourth filter code 722, having one or more parameter data 724. Each of the filters can be implemented using the loop operation of FIG. 6, according to some example embodiments. In some example embodiments, each of the filters can be nested and applied at once in the sequence shown in user interface view 702 without looping or iterating.

Figure 8A:
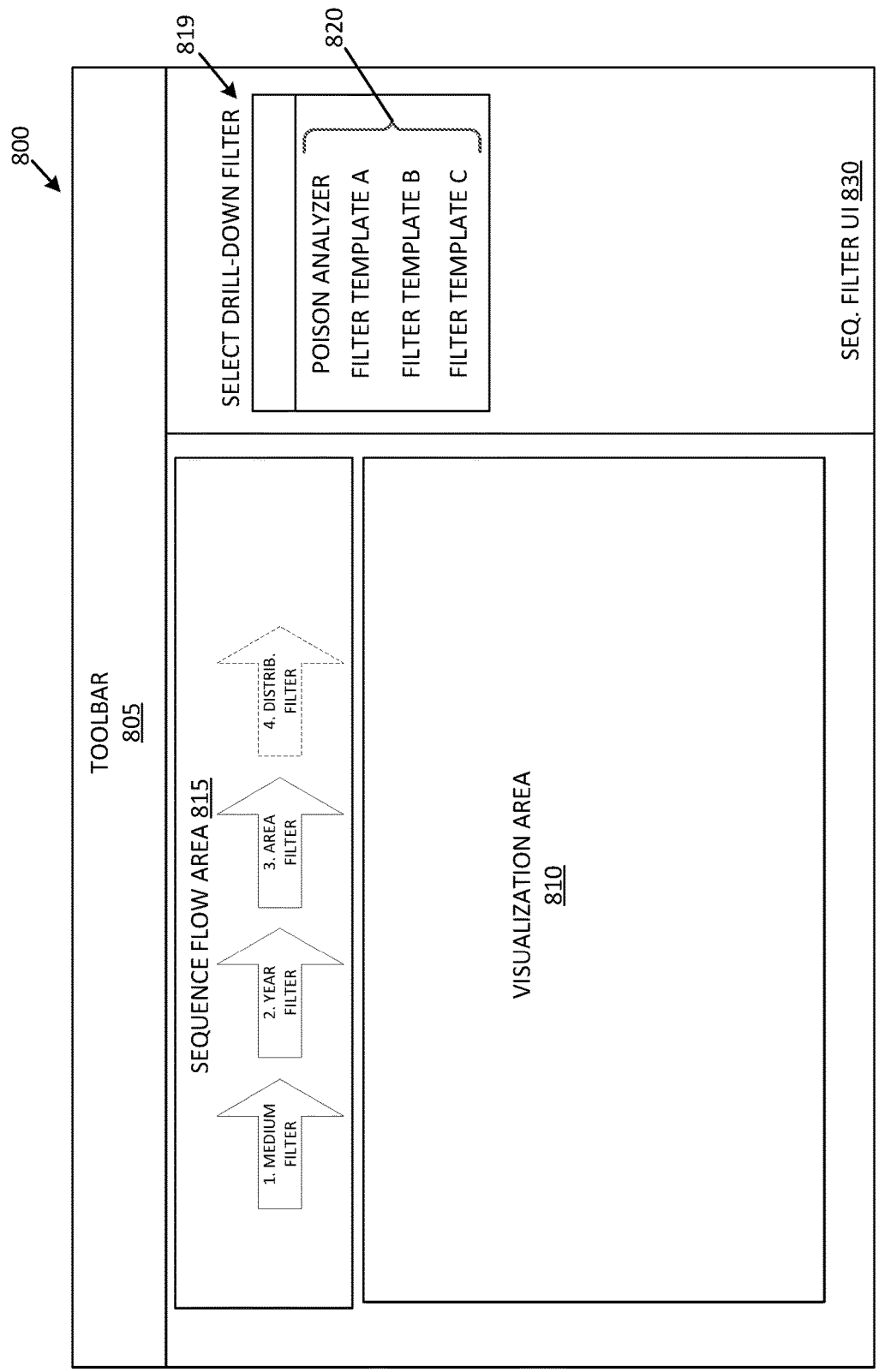
FIGS. 8A-8H illustrate user interfaces of a data visualizer using sequenced template filters, according to some example embodiments.

FIGS. 8A-D illustrate user interfaces of a data visualizer implementing sequenced template filters, according to some example embodiments. As illustrated in FIG. 8A, data visualizer user interface 800 comprises a toolbar area 805, a visualization area 810 to display data (e.g., datasets, reduced datasets), a sequence flow area 815 that shows the filters to be applied per the selected template, and a sequenced filter user interface 830 as generated by the user interface engine 220 of the query sequencer 115. As illustrated, the sequenced filter user interface 830 may display different template options 820 in a drop-down menu 819. The template options 820 may be provided by the template library 230, according to some embodiments. Assuming the user selects the "Poison Analyzer" from the template options 820, the sequence flow area 815 will display the filters to be applied for the selected template, and further display the sequence or order of the filters to be applied. The right-most filter may be indicated as optional through graying out, or through use of broken lines. Optional filters are filters that the expert-user designated as not necessary for investigative analysis, but may yield beneficial results in some cases, so the optional filters remain selectable by the non-expert user.

Figure 8B:
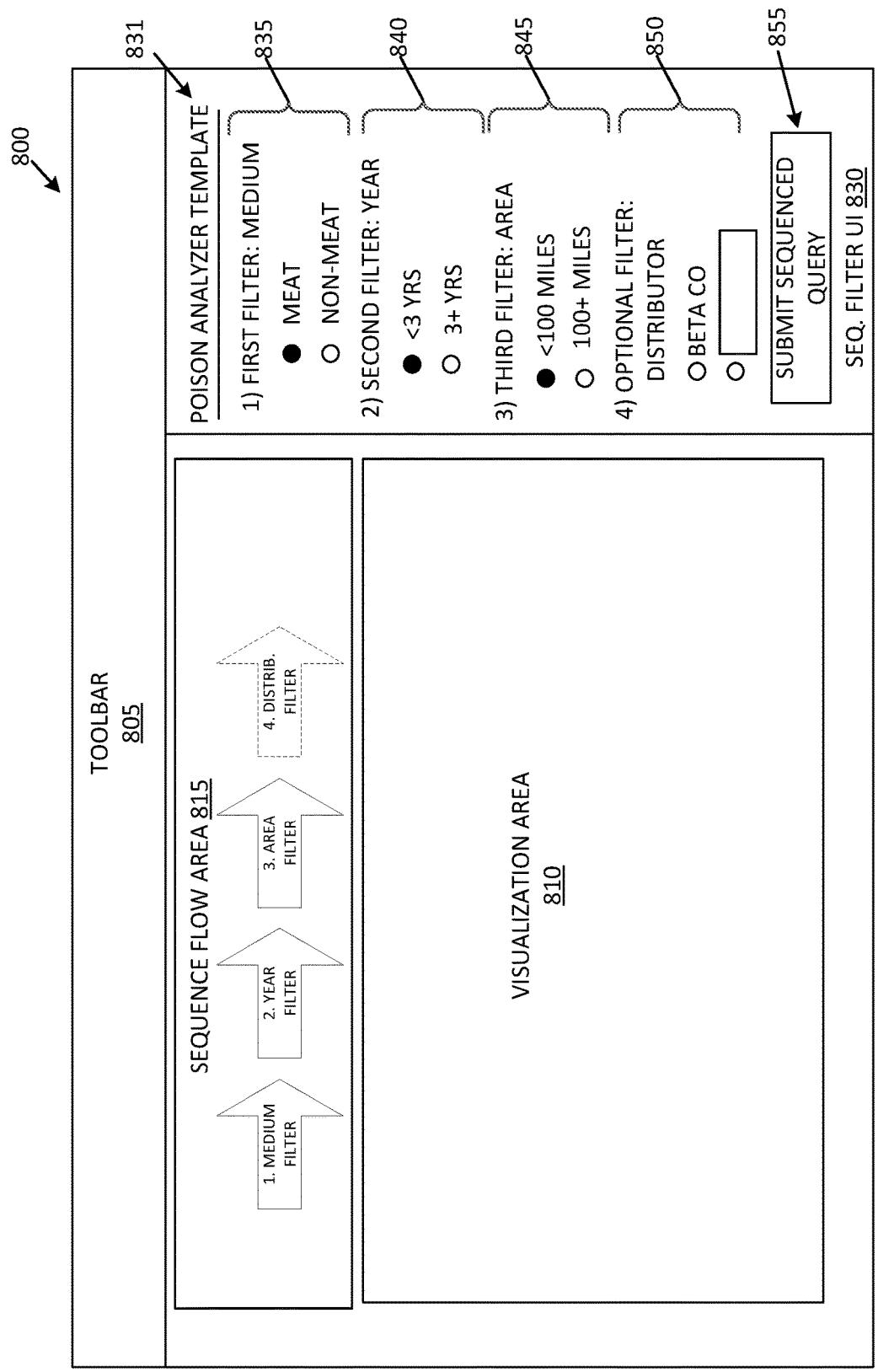

FIG. 8B illustrates a data visualizer user interface 800 of the data visualizer 114, with the selected sequenced template filter displayed in the sequenced filter user interface 830. As illustrated, the selected filter is the poison analyzer template 831, comprising a first filter 835, for the "medium" of food contaminate; a second filter 840 for the year range to be considered; a third filter 845 for the geographic area to be analyzed; and a fourth filter 850, which is an optional filter for analyzing distributors. Each of the filter's 835-850 have checkboxes with options selectable by the non-expert user. Each of the utilized checkboxes modifies the customization parameters of the filter, e.g., parameter data 712 of FIG. 7, according to some example embodiments. As illustrated, the fourth filter 850 is left blank, with no selection being made, and no data entered into the illustrated input field. As such, the to-be-generated query comprises three levels, and skips the optional fourth filter 850.

Upon selecting the submit sequenced query 855, the filters and parameters of the selected poison analyzer template 831 are applied to the dataset to generate a reduced dataset (e.g., reduced dataset 706). As discussed, in some embodiments, the data visualizer 114 can directly apply the sequence filter template to the dataset using the database engine 275. In other example embodiments, the sequenced filter template query code is constructed by the query constructor engine 250 on the client device 110, then transmitted to the data visualizer backend system 150 for application to the dataset and generation of the reduced dataset, as discussed above with reference to FIG. 5.

Figure 8C:
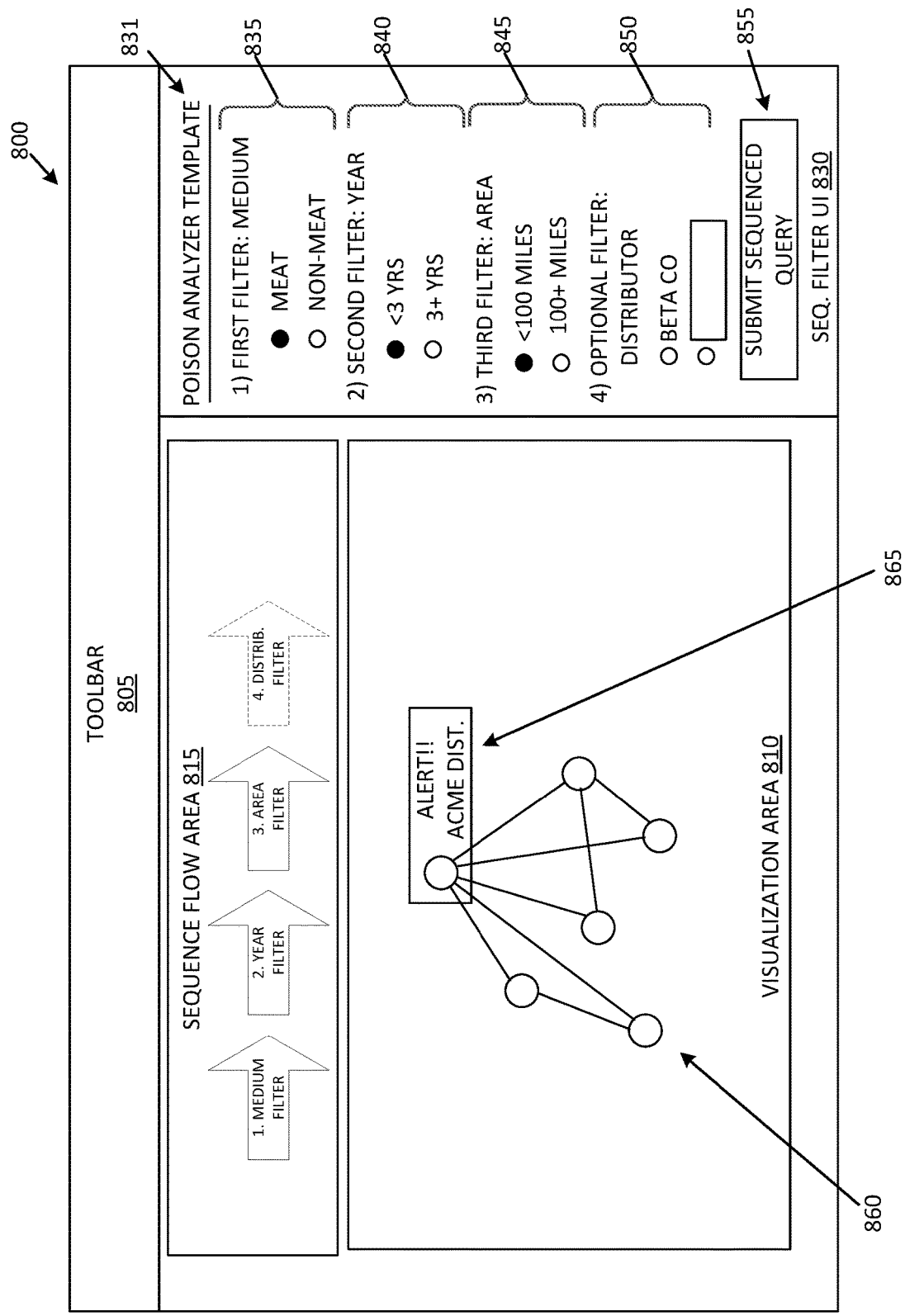

FIG. 8C shows an example reduced dataset 860 that results from applying the poison analyzer template 831 to the dataset. As illustrated, the reduced dataset 860 is visualized in the visualization area 810 as a network graph comprising nodes that are connected by edges. Each of the nodes can correspond to different data entities, such as restaurant locations, or other parameters in the dataset. As illustrated, each of the nodes corresponds to a distributor, "Acme Distributor." Because the reduced dataset 860 was generated by a specially configured sequenced filter template, the reduced dataset 860 will more readily identify target data. For example, the identified target node 865 here can be flagged as having the most network connections to other nodes, thus likely being the source of the food poisoning.

Figure 8D:
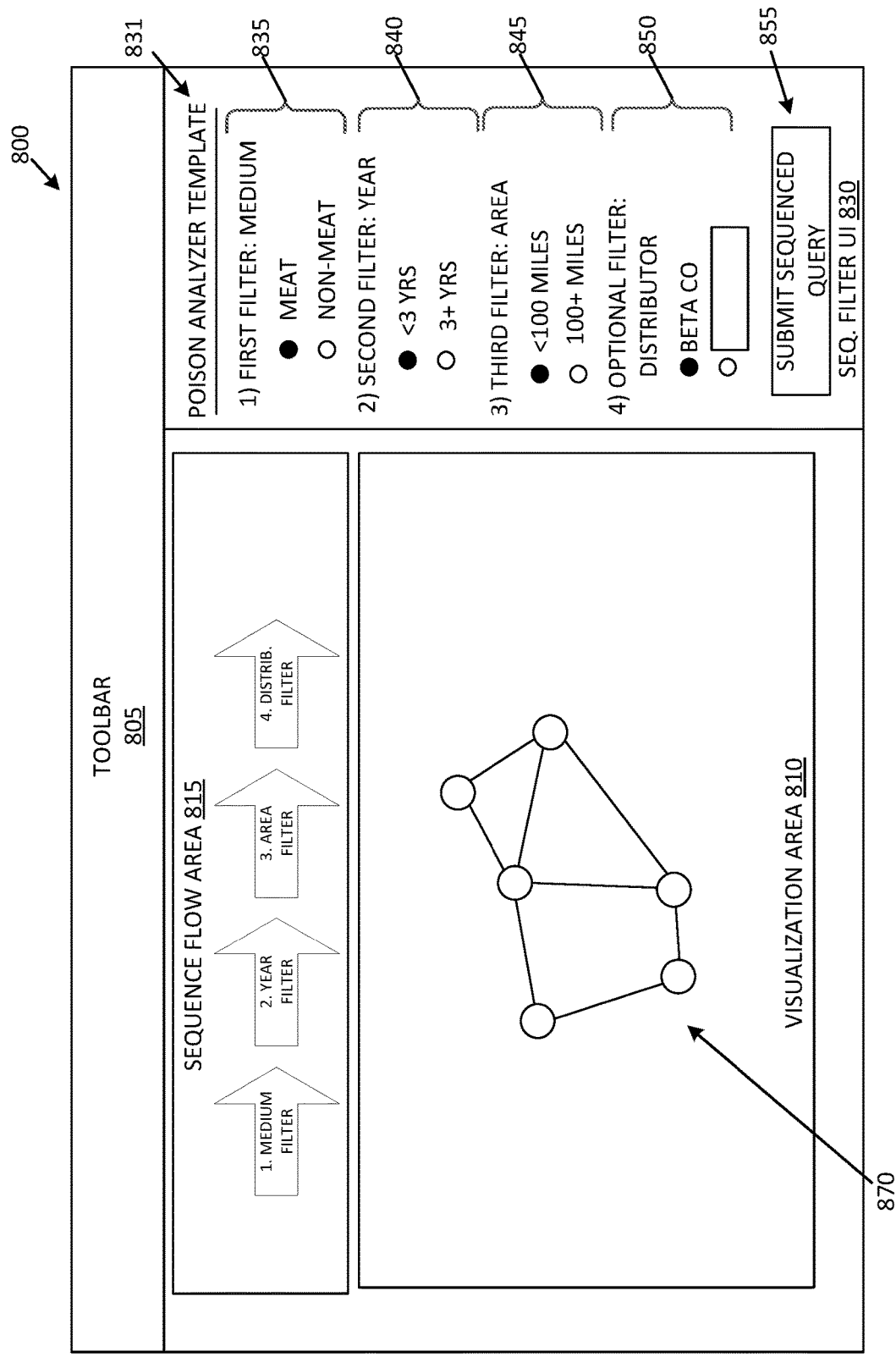

FIG. 8D shows an example reduced dataset 870 visualized as a network graph. In some example embodiments, network graphs (e.g., a social graph) depict a database item as a circle or "node", which are connected by lines or "edges"). The reduced dataset 870 of FIG. 8D was generated by applying the optional fourth filter 850. In particular, the fourth filter's 850 customization parameters were set to "Beta Co." Thus, the reduced dataset 870 may not readily identify the source of the food poisoning because "Acme Distributor" would be filtered out by the fourth filter 850. Thus, a non-expert user can defer to the selection of filter, the ordering of the filters, and any default parameters as arranged by the expert user; however, the non-expert user may still have the ability to modify the query away from the expert's selection through selecting different user interface objects.

FIGS. 8E-8H depict different types of visualizations that may be used to display the reduced dataset, according to some example embodiments. The visualizations may stored and otherwise managed by visualization library. Upon a reduced dataset being generated, a user (e.g., non-expert user) can select a visualization from the visualization library 270 to display the data. In some embodiments, the expert investigative user may specify which visualization may be used to display the reduced dataset. For example, the expert user may know from experience that target data (e.g., source of an outbreak) may best be displayed in a network graph. Thus upon applying the sequenced filter template by the non-expert user, the data visualizer 114 generates the reduced dataset as described above, but further automatically displays the reduced dataset using the visualization specified by the non-expert user.

Figure 8E:
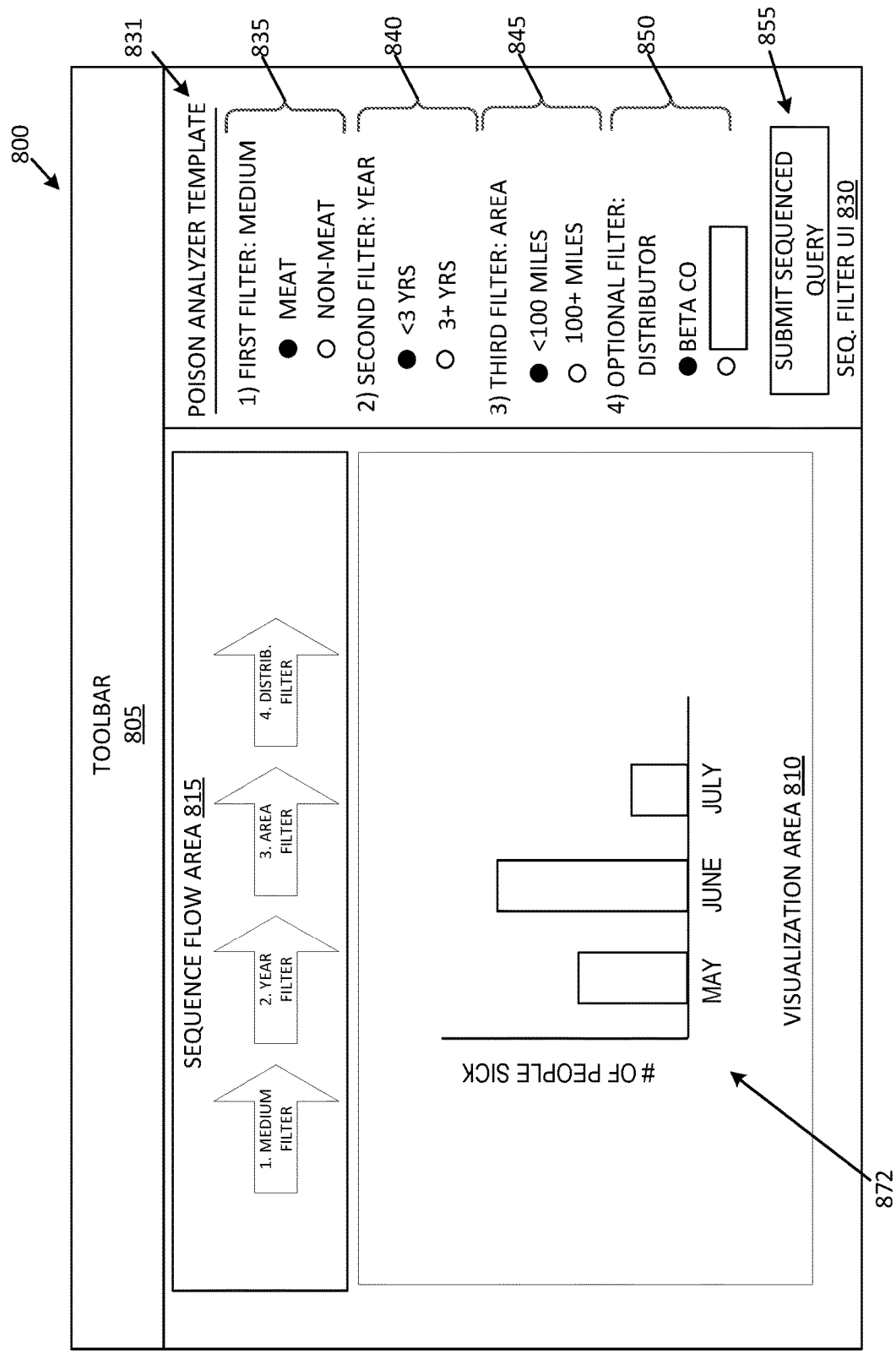
Figure 8F:
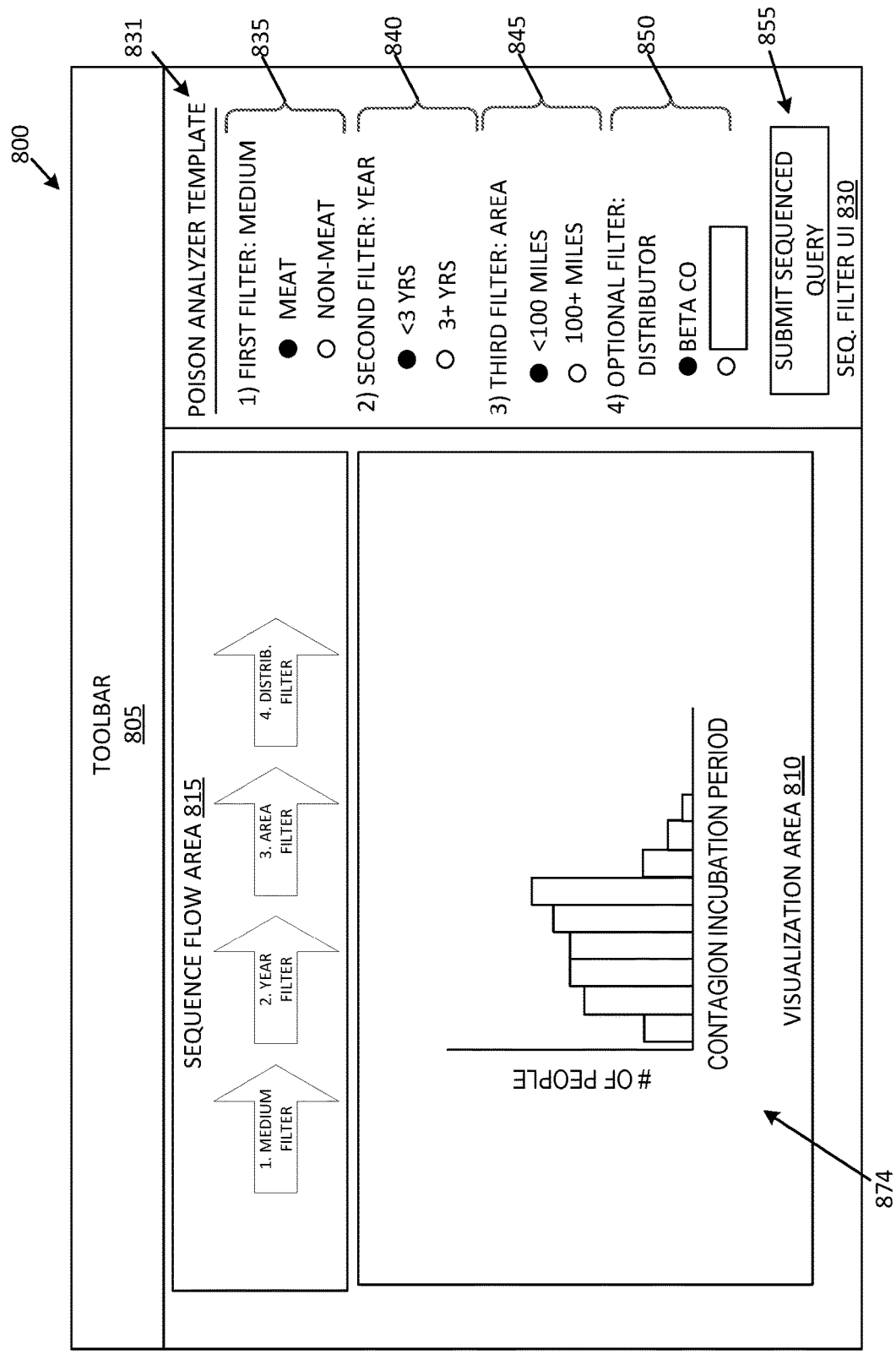
Figure 8G:
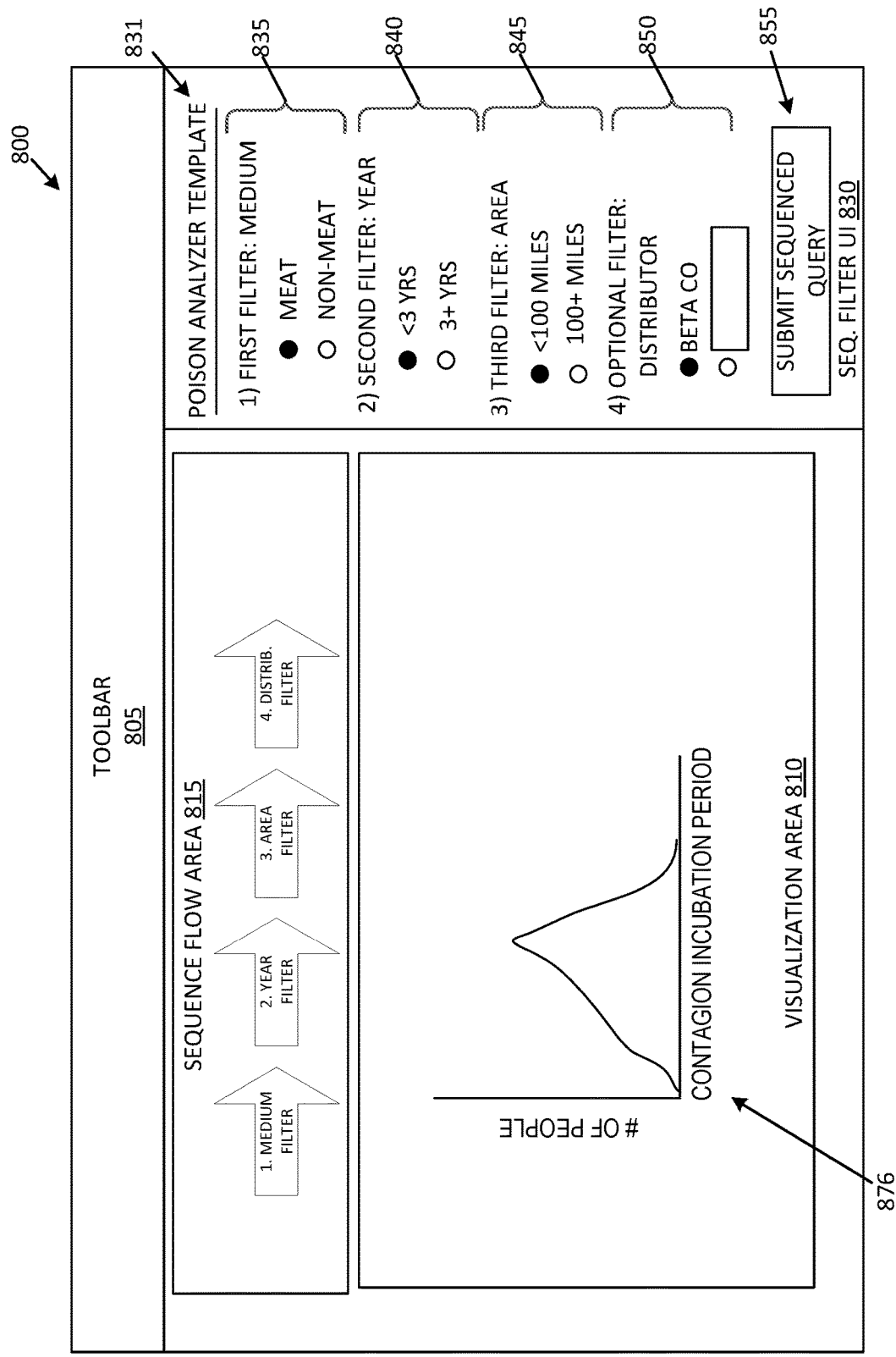
Figure 8H:
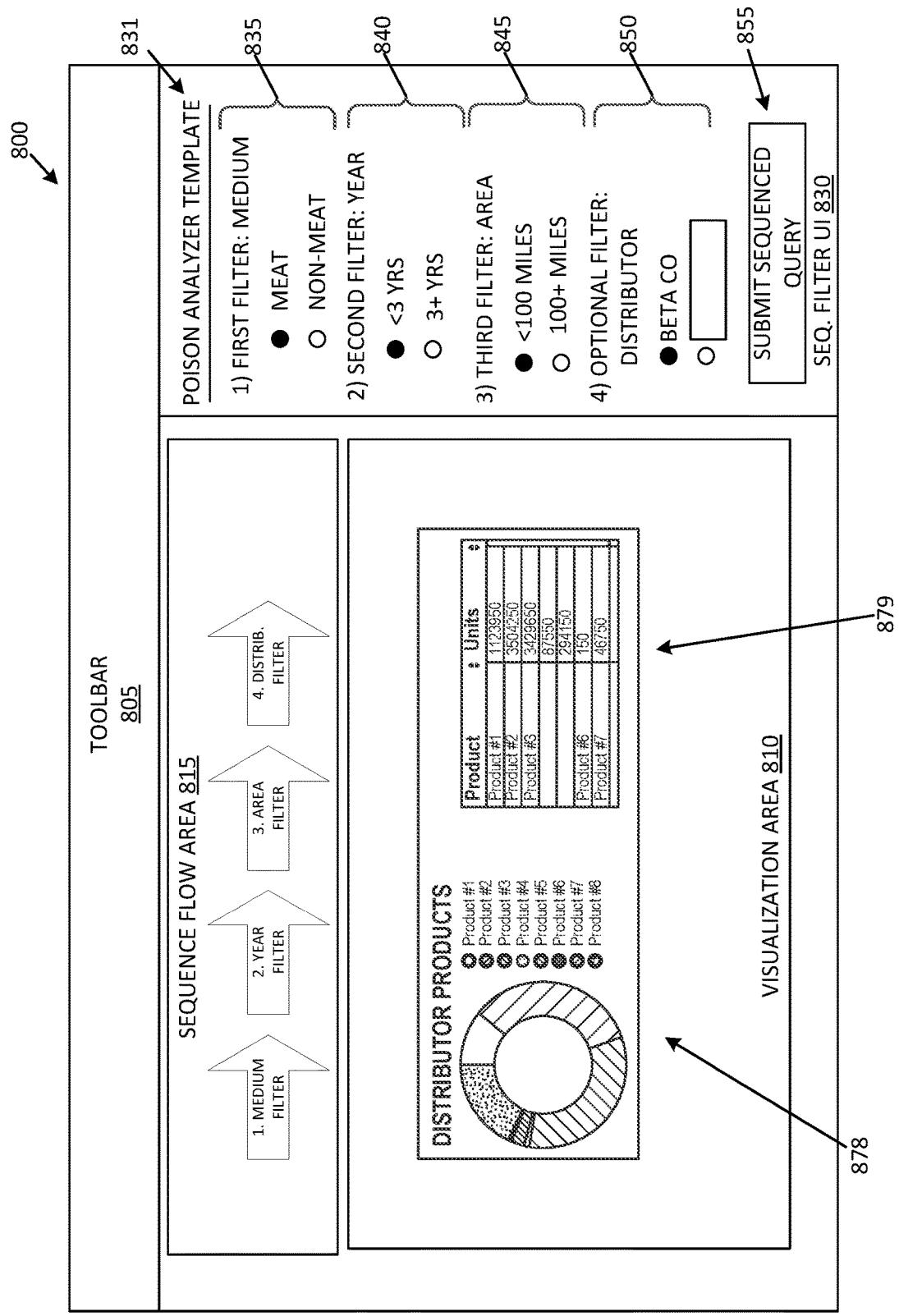

FIG. 8E illustrates a bar graph visualization 872 representation of displaying the reduced dataset, according to some example embodiment. FIG. 8F illustrates the reduced dataset displayed as a histogram visualization 874. A histogram is similar to a bar graph, but generally a histogram illustrates data input as a continuum of ranges or range sets, whereas a bar graph displays data as separate categories. FIG. 8G illustrates the reduced dataset displayed as a distribution plot 876. FIG. 8H illustrates the reduced dataset displayed as a pie chart 878 and a table 879, according to some example embodiments.

With reference to FIGS. 9-11B, the client device 110 can execute an Internet browser configured to use a browser parser 112 to retrieve data from webpages and store them as the dataset to be analyzed, as discussed above, and on some embodiments, the browser parser 112 is an Internet browser with a plugin that is configured to perform the parse operations.

Figure 9:
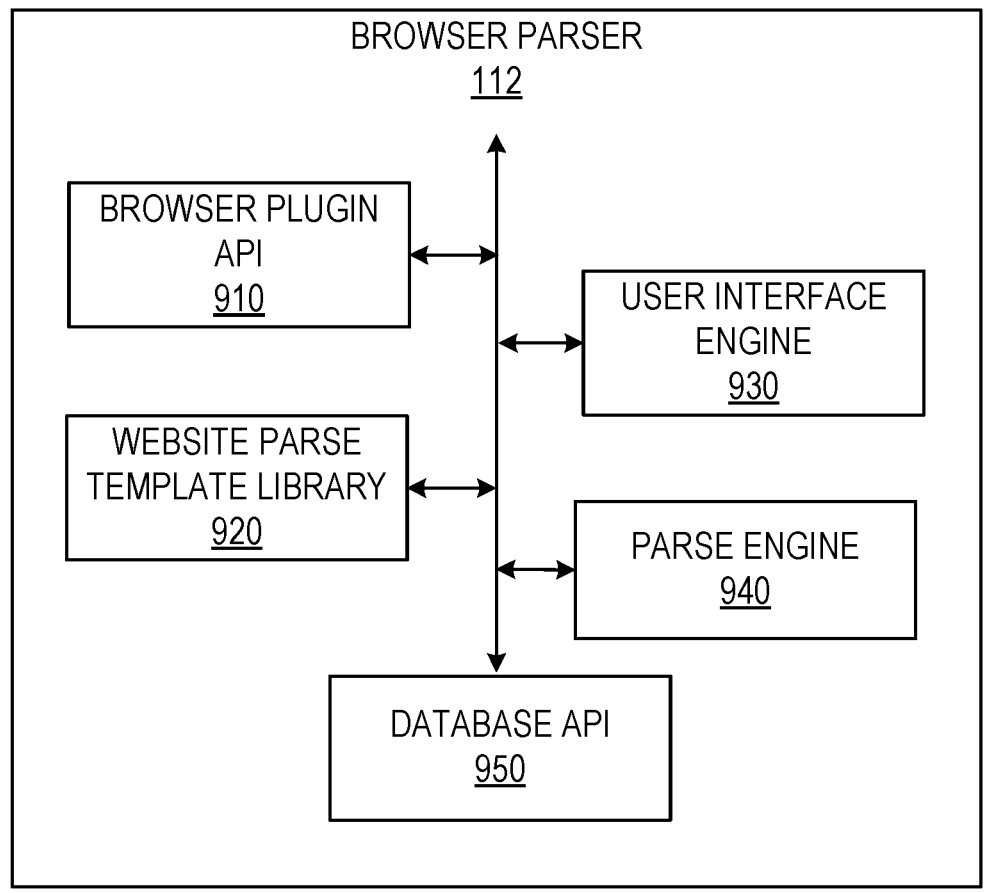
FIG. 9 is a block diagram showing components provided within a browser parser, according to example embodiments.

FIG. 9 is a block diagram showing components provided within the browser parser 112, according to some embodiments. In various example embodiments, the browser parser 112 comprises a browser plugin API 910, a website parse template library 920, a user interface engine 930, a parse engine 940, and a database API 950. The browser plugin API 910 is a plugin programming interface that configures the browser parser 112 to work as a plugin or extension application for an Internet browser (e.g., Google Chrome, Microsoft Internet Explorer, Apple Safari, Mozilla Firefox). Upon the browser loading a webpage of a website, the browser plugin API 910 receives notification of which website the webpage was provided. The website parse template library 920 comprises different parse templates for different websites. In some example embodiments, parse engine 940 determines whether there is a parse template for the current website in the website parse template library 920. A parse template is a template configured to identify different fields of the source code of pages from the website. If there is a template in the website parse template library 920, the parse engine 940 uses the template to parse the source code of the webpage and extract data from different fields. The user interface engine 930 generates a parse user interface with fields populated with data obtained from parsing the webpage. The data obtained from parsing the webpage can be submitted through the parse user interface to be stored as a database object having attribute values defined by the fields parsed. The database API 950 is configured to store the parsed object as the dataset through interfacing with the dataset management device, e.g., database server 124 or data visualizer backend system 150.

Figure 10:
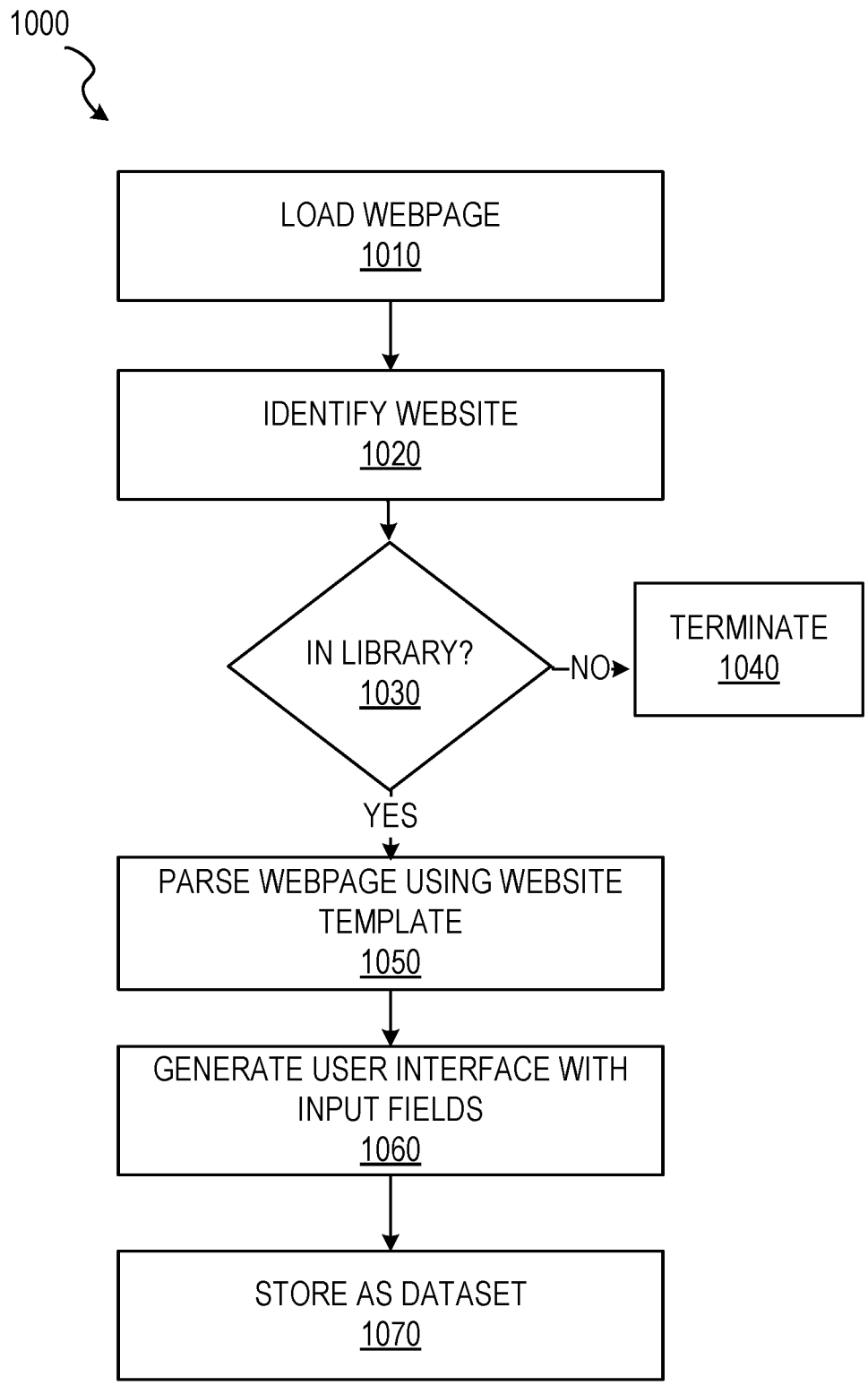
FIG. 10 is a flow diagram illustrating a method for parsing a webpage to generate a dataset for analysis, according to some example embodiments.

FIG. 10 is a flow diagram illustrating a method 1000 for parsing a webpage to generate a dataset for analysis, according to some example embodiments. At operation 1010, the browser parser 112 displays a webpage to the user 106 on a display screen of the client device 110. At operation 1020, the parse engine 940 receives, from the browser plugin API 910, an identifier (e.g., URL) of the website served the current webpage. In operation 1030, the parse engine 940 searches the website parse template library 920 to determine whether a parse template exists for the website. In some example embodiments, the website parse template library 920 maintains a look-up table comprising a list of which websites have parse templates and further directions on which template to load for which website.

If the parse engine 940 determines, at operation 1030, that website parse template library 920 does not have a parse template for the website, then the browser parser 112 cannot parse the page and the process terminates as illustrated at operation 1040. However, if it is determined that a parse template exists for the website, the parse engine 940 retrieves the parse template from the website parse template library 920 for processing. At operation 1050, the parse engine 940 uses the parse template retrieved from the website parse template library 920 to parse the webpage. As discussed, a parse template is configured to identify fields and extract values from the source code of the page. For example, the source code of a webpage may include title field source code, such as "<title> sample title </title>". The browser parser 112 identifies the field using the tags (<title>), and extracts the data enclosed in the tags (sample title). The data obtained from parsing the webpage (e.g., sample title) are then passed to the user interface engine 930 for further processing. At operation 1060, the user interface engine 930 receives the parsed values and generates a user interface for display within the browser. The user interface displays a number of editable fields, each of which can be prepopulated with data parsed from the webpage. The user 106 can edit the data in the fields or enter new data into the field if none was parsed. At operation 1070, the user 106 clicks a submit button on the generated user interface, which causes the database API 950 to transmit or otherwise store the webpage as an object in the dataset.

Figure 11A:
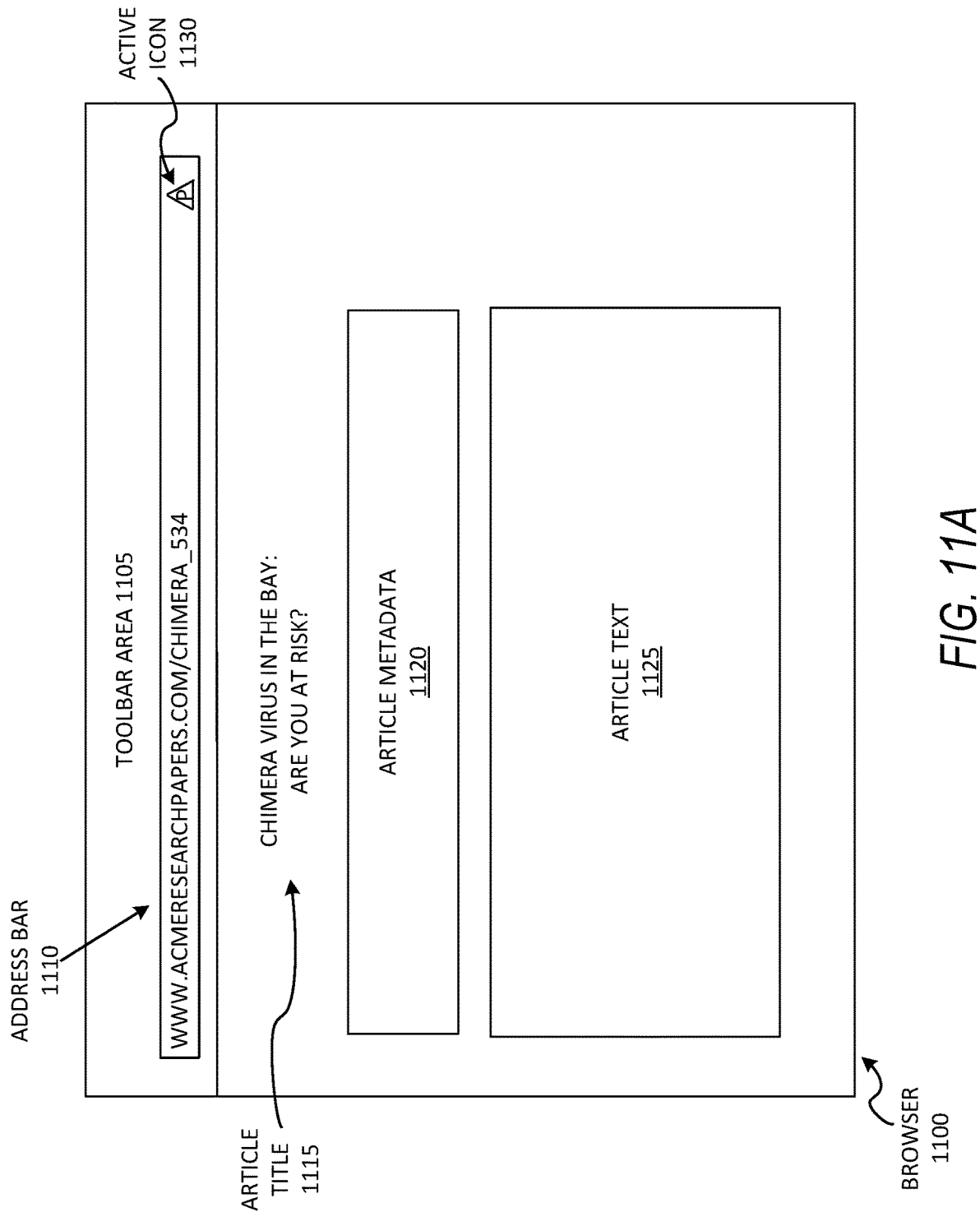
FIGS. 11A-11B illustrate user interfaces of a browser parser for generating a dataset from webpages, according to some example embodiments.
Figure 11B:
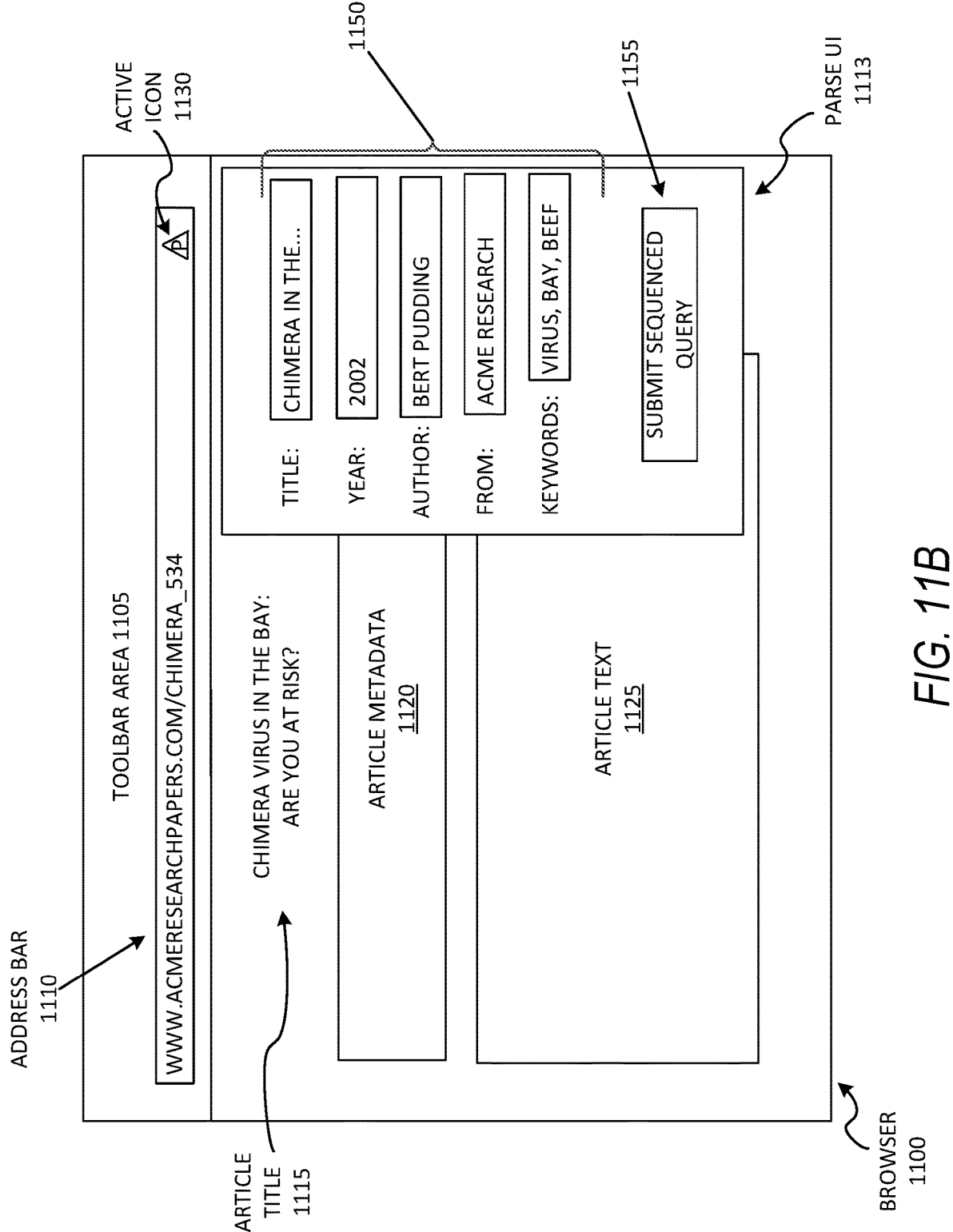

FIGS. 11A-11B illustrate user interfaces of a browser parser for generating a dataset from webpages, according to some example embodiments. In FIG. 11A, a browser 1100 comprising a toolbar area 1105 and an address bar 1110 is displayed. Through links or through directly inserting a URL into the address bar 1110, the user 106 can cause the browser 1100 to load pages from different sites. For example, as illustrated, browser 1100 has loaded a webpage from www.acmeresearchpapers.com/chimera_534. The webpage contains an article on the "chimera virus". The URL of the webpage is www.acmeresearchpapers.com. As illustrated, the webpage comprises an article title 1115, article metadata 1120 (e.g., authors, publisher, year published), and article text 1125. Upon loading the page, the browser plugin API 910 may display an active icon 1130 alerting the user 106 that pages from the Acme site are parsable. The user 106 may click on the active icon 1130, which causes the parse engine 940 to parse the webpage according to parse template for the website.

FIG. 11B illustrates a parse user interface 1113 generated by the user interface engine 930 in response to the user 106 clicking the active icon 1130. As illustrated, the parse user interface 1113 may pop-up or fade in as an overlay in a different layer over the displayed webpage. The parse user interface 1113 comprises a plurality of input fields 1150, including "title," which was prepopulated from the article title 1115; "year", "author", and "from," which were prepopulated from the article metadata 1120; and "keywords," which was prepopulated from the most common words found in the article text 1125. The input fields 1150 are modifiable by the user 106 to correct errors or change the information. For example, the user 106 may change the "year" from "2002" to "2008", or delete the year value. The parse user interface 1113 further includes a submit button 1155, which the user 106 may select to cause the database API 950 to store the webpage as a research paper database object having attributes including "title", "year", "author", "from", and "keywords". The research paper database object can be stored in the dataset, which can be analyzed using the sequenced filter templates discussed above. In this way, the client device 110 is configured as an efficient streamlined investigation tool: collecting information through the browser parser 112 and analyzing datasets, which include the collected information through a data visualizer 114 enhanced by guide investigations by the query sequencer 115.

Figure 12:
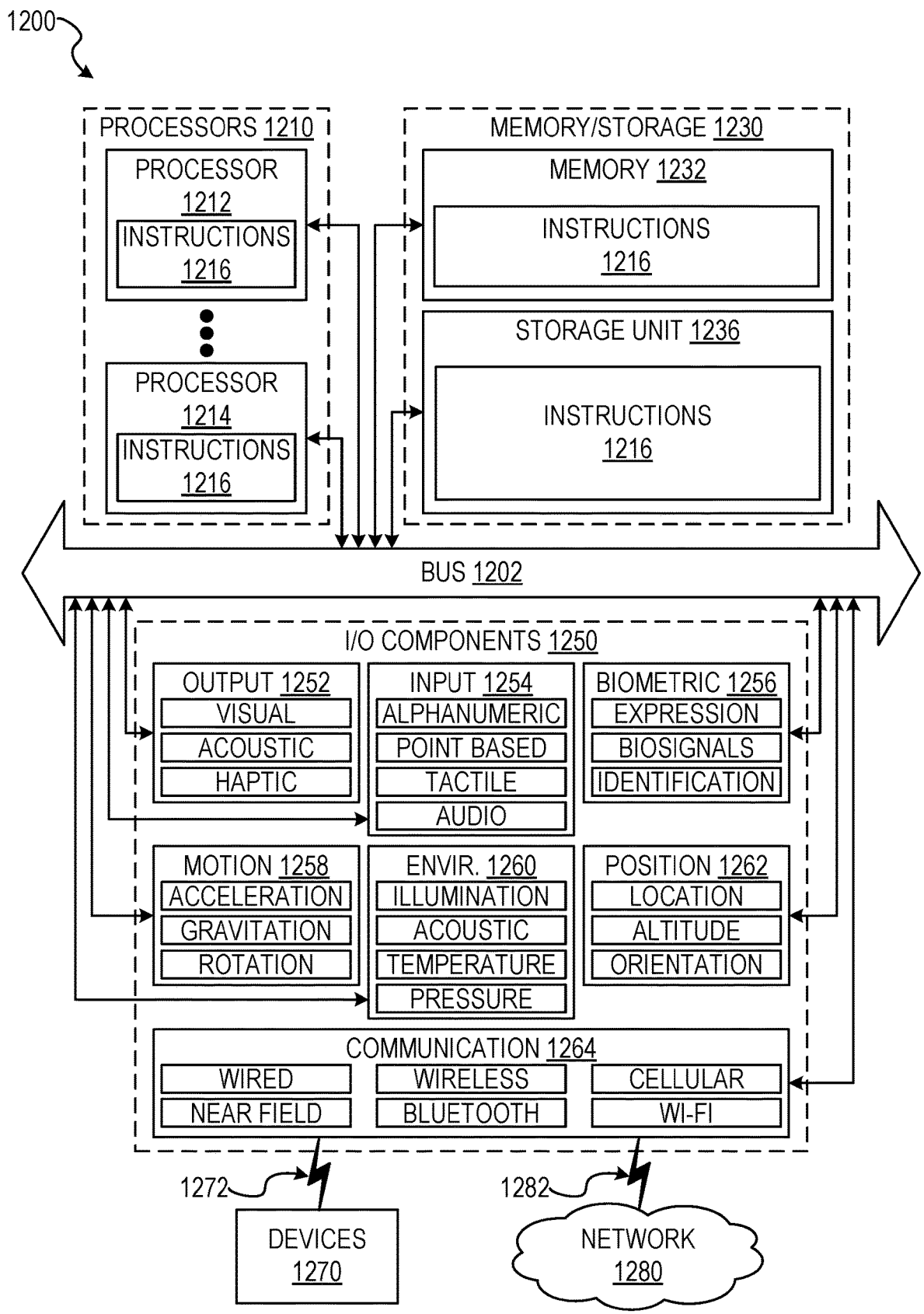
FIG. 12 illustrates a diagrammatic representation of a machine in the form of a computer system within which a set of instructions may be executed for causing the machine to perform any one or more of the methodologies discussed herein, according to an example embodiment.

FIG. 12 is a block diagram illustrating components of a machine 1200, according to some example embodiments, able to read instructions from a machine-readable medium (e.g., a machine-readable storage medium) and perform any one or more of the methodologies discussed herein. Specifically, FIG. 12 shows a diagrammatic representation of the machine 1200 in the example form of a computer system, within which instructions 1216 (e.g., software, a program, an application, an applet, an app, or other executable code) for causing the machine 1200 to perform any one or more of the methodologies discussed herein can be executed. For example, the instructions 1216 can cause the machine 1200 to execute the flow diagrams of FIGS. 4, 5, 6, and 10. Additionally, or alternatively, the instructions 1216 can implement the plugin engine 210, the user interface engine 220, the template library 230, the filter engine 240, query constructor engine 250, the backend API 300, the visualization library 270, the database engine 275, the browser plugin API 910, the website parse template library 920, the user interface engine 930, the parse engine 940, and the database API 950, of FIGS. 2, 3, and 9, and so forth. The instructions 1216 transform the general, non-programmed machine into a particular machine programmed to carry out the described and illustrated functions in the manner described. In alternative embodiments, the machine 1200 operates as a standalone device or can be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 can comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1216, sequentially or otherwise, that specify actions to be taken by the machine 1200. Further, while only a single machine 1200 is illustrated, the term "machine" shall also be taken to include a collection of machines 1200 that individually or jointly execute the instructions 1216 to perform any one or more of the methodologies discussed herein.

The machine 1200 can include processors 1210, memory/storage 1230, and I/O components 1250, which can be configured to communicate with each other such as via a bus 1202. In an example embodiment, the processors 1210 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) can include, for example, processor 1212 and processor 1214 that may execute instructions 1216. The term "processor" is intended to include multi-core processor that may comprise two or more independent processors (sometimes referred to as "cores") that can execute instructions contemporaneously. Although FIG. 12 shows multiple processors 1210, the machine 1200 may include a single processor with a single core, a single processor with multiple cores (e.g., a multi-core processor), multiple processors with a single core, multiple processors with multiples cores, or any combination thereof.

The memory/storage 1230 can include a memory 1232, such as a main memory, or other memory storage, and a storage unit 1236, both accessible to the processors 1210 such as via the bus 1202. The storage unit 1236 and memory 1232 store the instructions 1216 embodying any one or more of the methodologies or functions described herein. The instructions 1216 can also reside, completely or partially, within the memory 1232, within the storage unit 1236, within at least one of the processors 1210 (e.g., within the processor's cache memory), or any suitable combination thereof, during execution thereof by the machine 1200. Accordingly, the memory 1232, the storage unit 1236, and the memory of the processors 1210 are examples of machine-readable media.

As used herein, the term "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) or any suitable combination thereof. The term "machine-readable medium" should be taken to include a single medium or multiple media (e.g., a centralized or distributed database, or associated caches and servers) able to store instructions 1216. The term "machine-readable medium" shall also be taken to include any medium, or combination of multiple media, that is capable of storing instructions (e.g., instructions 1216) for execution by a machine (e.g., machine 1200), such that the instructions, when executed by one or more processors of the machine 1200 (e.g., processors 1210), cause the machine 1200 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1250 can include a wide variety of components to receive input, provide output, produce output, transmit information, exchange information, capture measurements, and so on. The specific I/O components 1250 that are included in a particular machine will depend on the type of machine. For example, portable machines such as mobile phones will likely include a touch input device or other such input mechanisms, while a headless server machine will likely not include such a touch input device. It will be appreciated that the I/O components 1250 can include many other components that are not shown in FIG. 12. The I/O components 1250 are grouped according to functionality merely for simplifying the following discussion, and the grouping is in no way limiting. In various example embodiments, the I/O components 1250 can include output components 1252 and input components 1254. The output components 1252 can include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1254 can include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In further example embodiments, the I/O components 1250 can include biometric components 1256, motion components 1258, environmental components 1260, or position components 1262 among a wide array of other components. For example, the biometric components 1256 can include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1258 can include acceleration sensor components (e.g., an accelerometer), gravitation sensor components, rotation sensor components (e.g., a gyroscope), and so forth. The environmental components 1260 can include, for example, illumination sensor components (e.g., a photometer), temperature sensor components (e.g., one or more thermometers that detect ambient temperature), humidity sensor components, pressure sensor components (e.g., a barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1262 can include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1250 may include communication components 1264 operable to couple the machine 1200 to a network 1280 or devices 1270 via a coupling 1282 and a coupling 1272, respectively. For example, the communication components 1264 include a network interface component or other suitable device to interface with the network 1280. In further examples, communication components 1264 include wired communication components, wireless communication components, cellular communication components, Near Field Communication (NFC) components, BLUETOOTH® components (e.g., BLUETOOTH® Low Energy), WI-FI® components, and other communication components to provide communication via other modalities. The devices 1270 may be another machine or any of a wide variety of peripheral devices (e.g., a peripheral device coupled via a Universal Serial Bus (USB)).

Moreover, the communication components 1264 can detect identifiers or include components operable to detect identifiers. For example, the communication components 1264 can include Radio Frequency Identification (RFID) tag reader components, NFC smart tag detection components, optical reader components (e.g., an optical sensor to detect one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1264, such as location via Internet Protocol (IP) geo-location, location via WI-FI® signal triangulation, location via detecting a BLUETOOTH® or NFC beacon signal that may indicate a particular location, and so forth.

In various example embodiments, one or more portions of the network 1280 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a WI-FI® network, another type of network, or a combination of two or more such networks. For example, the network 1280 or a portion of the network 1280 may include a wireless or cellular network, and the coupling 1282 may be a Code Division Multiple Access (CDMA) connection, a Global System for Mobile communications (GSM) connection, or other type of cellular or wireless coupling. In this example, the coupling 1282 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 1216 can be transmitted or received over the network 1280 using a transmission medium via a network interface device (e.g., a network interface component included in the communication components 1264) and utilizing any one of a number of well-known transfer protocols (e.g., Hypertext Transfer Protocol (HTTP)). Similarly, the instructions 1216 can be transmitted or received using a transmission medium via the coupling 1272 (e.g., a peer-to-peer coupling) to devices 1270. The term "transmission medium" shall be taken to include any intangible medium that is capable of storing, encoding, or carrying the instructions 1216 for execution by the machine 1200, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
    receiving, from a first client device, data defining a sequenced filter template comprising a plurality of reducing filters selected from a set of filter templates and an order in which to apply the plurality of reducing filters to reduce one or more datasets;
    causing display of a presentation of the sequenced filter template among a plurality of sequenced filter templates at a second client device, the presentation of the sequenced filter template comprising a display of the plurality of reducing filters and the order in which to apply the plurality of reducing filters;
    receiving, from the second client device, a request to apply the sequenced filter template to a dataset, the request including a selection of the presentation of the sequenced filter template that includes a selected refinement to the sequenced filter template; and
    in response to receiving the request, generating a reduced dataset by applying each of the plurality of reducing filters to the dataset in the order specified in the sequenced filter template according to the selected refinement, yielding the reduced dataset.

2. The method of claim 1, wherein each of the plurality of reducing filters is configured to reduce one or more datasets by removing data that matches a parameter for reduction.

3. The method of claim 1, wherein the plurality of reducing filters comprises a first reducing filter and a second reducing filter.

4. The method of claim 3, wherein generating the reduced dataset comprises:
    generating a first reduced dataset by applying the first reducing filter to the dataset; and
    generating a second reduced dataset by applying the second reducing filter to the first reduced dataset.

5. The method of claim 1, wherein generating the reduced dataset further comprises storing the second reduced dataset as the reduced dataset.

6. The method of claim 1, wherein the method further comprises:
    causing display of a visualization of the reduced dataset.

7. The method of claim 6, wherein the visualization of the sequenced filter template displayed on the second client device is within a user interface.

8. A system comprising:
    one or more processors; and
    a memory comprising instructions which, when executed by the one or more processors, cause the system to perform operations comprising:
    receiving, from a first client device, data defining a sequenced filter template comprising a plurality of reducing filters selected from a set of filter templates and an order in which to apply the plurality of reducing filters to reduce one or more datasets;
    causing display of a presentation of the sequenced filter template among a plurality of sequenced filter templates at a second client device, the presentation of the sequenced filter template comprising a display of the plurality of reducing filters and the order in which to apply the plurality of reducing filters;
    receiving, from the second client device, a request to apply the sequenced filter template to a dataset, the request including a selection of the presentation of the sequenced filter template that includes a selected refinement to the sequenced filter template; and
    in response to receiving the request, generating a reduced dataset by applying each of the plurality of reducing filters to the dataset in the order specified in the sequenced filter template according to the selected refinement, yielding the reduced dataset.

9. The system of claim 8, wherein each of the plurality of reducing filters is configured to reduce one or more datasets by removing data that matches a parameter for reduction.

10. The system of claim 8, wherein the plurality of reducing filters comprises a first reducing filter and a second reducing filter.

11. The system of claim 10, wherein generating the reduced dataset comprises:
    generating a first reduced dataset by applying the first reducing filter to the dataset; and
    generating a second reduced dataset by applying the second reducing filter to the first reduced dataset.

12. The system of claim 8, wherein generating the reduced dataset further comprises storing the second reduced dataset as the reduced dataset.

13. The system of claim 8, wherein the instructions further comprise:
    causing display of a visualization of the reduced dataset.

14. The system of claim 13, wherein the visualization of the sequenced filter template displayed on the second client device is within a user interface.

15. A computer-readable storage device embodying instructions that, when executed by one or more computer processors of one or more computing devices, cause the one or more computing devices to perform operations comprising:
    receiving, from a first client device, data defining a sequenced filter template comprising a plurality of reducing filters selected from a set of filter templates and an order in which to apply the plurality of reducing filters to reduce one or more datasets;

causing display of a presentation of the sequenced filter template among a plurality of sequenced filter templates at a second client device, the presentation of the sequenced filter template comprising a display of the plurality of reducing filters and the order in which to apply the plurality of reducing filters;

receiving, from the second client device, a request to apply the sequenced filter template to a dataset, the request including a selection of the presentation of the sequenced filter template that includes a selected refinement to the sequenced filter template; and in response to receiving the request, generating a reduced dataset by applying each of the plurality of reducing filters to the dataset in the order specified in the sequenced filter template according to the selected refinement, yielding the reduced dataset.

16. The computer-readable storage device of claim 15, wherein each of the plurality of reducing filters is configured to reduce one or more datasets by removing data that matches a parameter for reduction.

17. The computer-readable storage device of claim 15, wherein the plurality of reducing filters comprises a first reducing filter and a second reducing filter.

18. The computer-readable storage device of claim 17, wherein generating the reduced dataset comprises:

generating a first reduced dataset by applying the first reducing filter to the dataset; and generating a second reduced dataset by applying the second reducing filter to the first reduced dataset.

19. The computer-readable storage device of claim 15, wherein generating the reduced dataset further comprises storing the second reduced dataset as the reduced dataset.

20. The computer-readable storage device of claim 15, wherein the instructions further comprise:

causing display of a visualization of the reduced dataset.

\* \* \* \* \*